United States Patent
Mizota et al.

(10) Patent No.: US 7,098,281 B2
(45) Date of Patent: Aug. 29, 2006

(54) PLASTIC OPTICAL FIBER, OPTICAL FIBER CABLE, OPTICAL FIBER CABLE WITH PLUG, METHOD FOR PRODUCING METHYL METHACRYLATE BASED POLYMER AND METHOD FOR PRODUCING PLASTIC OPTICAL FIBER

(75) Inventors: Hirotoshi Mizota, Hiroshima (JP); Tomonari Murakami, Hiroshima (JP); Yoshihiro Uozu, Hiroshima (JP); Shigeaki Sasaki, Toyama (JP); Koji Ishizaka, Toyama (JP); Takeshi Kitayama, Toyama (JP); Tatsuyuki Takayanagi, Toyama (JP); Jun-ichiro Atarashi, Toyama (JP); Yasukazu Yoshida, Hiroshima (JP); Masaharu Yanai, Hiroshima (JP); Motomu Oh-Kita, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 10/824,524

(22) Filed: Apr. 15, 2004

(65) Prior Publication Data

US 2004/0197069 A1 Oct. 7, 2004

Related U.S. Application Data

(62) Division of application No. 09/622,057, filed as application No. PCT/JP99/00821 on Feb. 24, 1999, now Pat. No. 6,777,083.

(30) Foreign Application Priority Data

| Feb. 24, 1998 | (JP) | ................................. 10-042526 |
| Aug. 5, 1998 | (JP) | ................................. 10-221911 |
| Aug. 6, 1998 | (JP) | ................................. 10-223056 |

(51) Int. Cl.
*C08F 4/04* (2006.01)
(52) U.S. Cl. .................. 526/219; 526/88; 526/89; 526/224; 526/245; 526/329.7
(58) Field of Classification Search ................ 359/652, 359/654; 526/88, 224, 245, 329.7, 219; 250/370.08
See application file for complete search history.

(56) References Cited

U.S. PATENT DOCUMENTS

| 3,999,834 | A | | 12/1976 | Ohtomo et al. |
| 4,645,297 | A | | 2/1987 | Yoshihara et al. |
| 4,768,857 | A | | 9/1988 | Sakunaga et al. |
| 4,807,964 | A | | 2/1989 | Sare |
| 4,836,642 | A | * | 6/1989 | Matsumoto et al. ........ 385/145 |
| 4,872,740 | A | | 10/1989 | Terada et al. |
| 5,127,079 | A | | 6/1992 | Suzuki et al. |
| 5,175,786 | A | * | 12/1992 | Toyoda et al. ............... 385/124 |
| 5,287,222 | A | * | 2/1994 | Uozu et al. .................. 359/654 |
| 5,614,253 | A | | 3/1997 | Nonaka et al. |
| 5,728,793 | A | * | 3/1998 | Kumagai et al. ........ 526/329.7 |
| 6,632,907 | B1 | | 10/2003 | Mizota et al. |

FOREIGN PATENT DOCUMENTS

| JP | 52-017555 | 5/1977 |
| JP | 63-094203 | 4/1988 |
| JP | 63-095402 | 4/1988 |
| JP | 02-043506 | 2/1990 |
| JP | 02-158702 | 6/1990 |
| JP | 03-059501 | 3/1991 |
| JP | 532722 | 5/1993 |
| JP | 5186510 | 7/1993 |
| JP | 07-077613 | 3/1995 |

* cited by examiner

*Primary Examiner*—Helen L. Pezzuto
(74) *Attorney, Agent, or Firm*—Oblon, Spivak, McClelland, Maier & Neustadt, P.C.

(57) ABSTRACT

This invention provides a process for manufacturing a methyl methacrylate polymer comprising the steps of feeding a monomer containing at least 80 wt % of methyl methacrylate and a radical polymerization initiator represented formula (III) to a reactor; polymerizing the material at a polymerization temperature of 110 to 160° C. under the conditions satisfying particular equations between an initiator concentration and a polymerization temperature; feeding a reaction mixture taken out from the reactor to a devolatilization step (feeding step); and separating and removing volatiles from the reaction mixture (devolatilization step). A methyl methacrylate polymer having adequately good optical properties and a plastic optical fiber having improved transmission performance can be prepared according to this invention

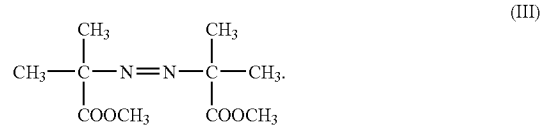

(III)

13 Claims, 1 Drawing Sheet

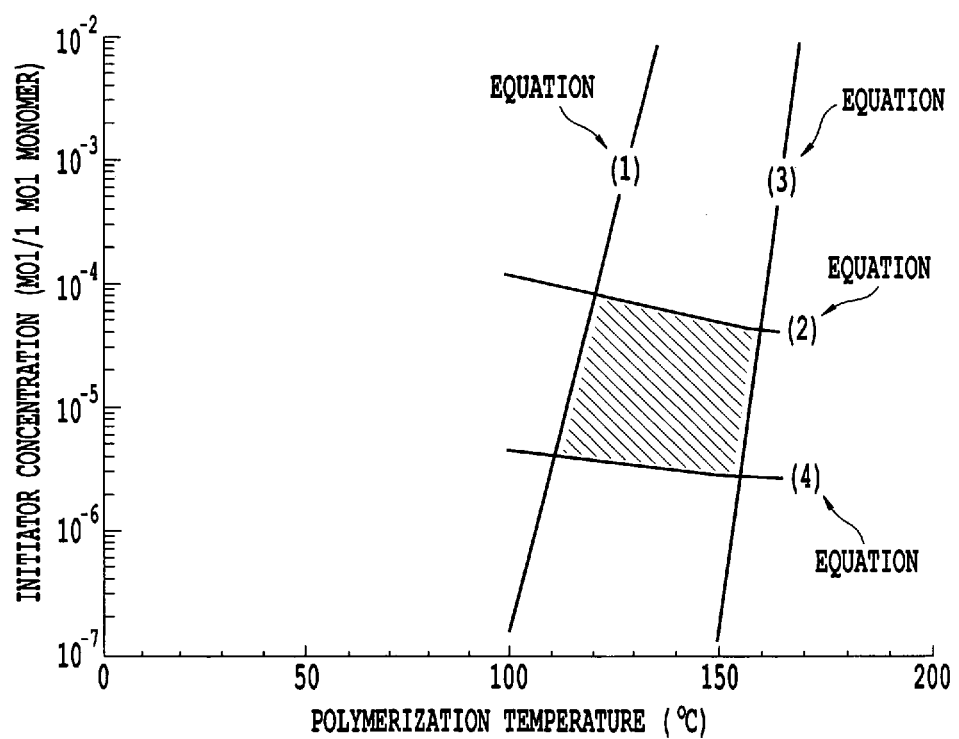

PLASTIC OPTICAL FIBER, OPTICAL FIBER CABLE, OPTICAL FIBER CABLE WITH PLUG, METHOD FOR PRODUCING METHYL METHACRYLATE BASED POLYMER AND METHOD FOR PRODUCING PLASTIC OPTICAL FIBER

This is a divisional application of U.S. application Ser. No. 09/622,057, filed Oct. 12, 2000, which is a 371 of PCT/JP99/00821, filed Feb. 24, 1999, now U.S. Pat. No. 6,777,083.

BACKGROUND OF THE INVENTION

1. Field of the Invention

This invention relates to a plastic optical fiber, an optical fiber cable and an optical fiber cable with a plug which have a reduced light-transmission loss; processes for manufacturing a methyl methacrylate polymer with improved optical properties; and processes for manufacturing a plastic optical fiber.

2. Description of the Prior Art

A methyl methacrylate polymer may be prepared by a polymerization process such as suspension polymerization, solution polymerization and bulk polymerization; bulk polymerization and solution polymerization are advantageous for reducing light-scattering matters such as dusts and impurities in a polymer. In particular, bulk polymerization is most advantageous because solution polymerization requires removing not only unreacted monomers but also a solvent. JP-B 5-32722 has disclosed a process for manufacturing a plastic optical fiber comprising the steps of preparing a methyl methacrylate polymer with improved optical properties and containing a reduced amount of light-scattering matters such as dusts and impurities and light-absorbing matters such as peroxides and oligomers, and then forming a plastic optical fiber using the polymer as a core component. In the process, the polymer is prepared using a radical polymerization initiator represented by formula (I) (hereinafter, referred to as an "initiator I") such that there is a relationship between an initiator concentration and a polymerization temperature satisfying a particular condition.

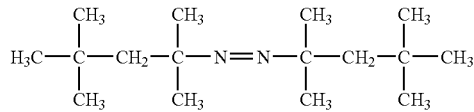

However, since the initiator I is used in the process of JP-B 5-32722, a polymer obtained has a terminal $C_5H_{11}$ moiety different from a methyl methacrylate unit, which causes an uneven molecular structure and deteriorated optical properties in the polymer. When using this polymer for preparing an optical fiber, the optical fiber exhibits inadequate transmission performance. Thus, there has not been provided a process for manufacturing a methyl methacrylate polymer with adequately improved optical properties, or for manufacturing a plastic optical fiber exhibiting satisfactory transmission performance.

SUMMARY OF THE INVENTION

An objective of this invention is to provide processes for manufacturing a methyl methacrylate polymer having adequately improved optical properties and for manufacturing a plastic optical fiber exhibiting satisfactory transmission performance.

This invention provides a process for manufacturing a methacrylate (co)polymer comprising conducting polymerization while feeding a monomer (mixture) containing at least 90 wt % in total of at least one methacrylate monomer and a radical polymerization initiator represented by formula (II) into a reactor, where an initiator concentration and a polymerization temperature satisfy a relationship represented by equations (1) to (4) and the polymerization temperature is not less than 110° C. and not more than 160° C.;

$$\ln(A) \leq 105.4 - 45126/B \quad (1)$$

$$\ln(A) \leq 2545.2/B - 15.82 \quad (2)$$

$$\ln(A) \geq 225.9 - 102168.8/B \quad (3)$$

$$\ln(A) \geq 1300.0/B - 15.74 \quad (4)$$

wherein A is an initiator concentration (a molar ratio of the initiator/the monomer); B is a polymerization temperature (° K); and ln is a symbol for a natural logarithm;

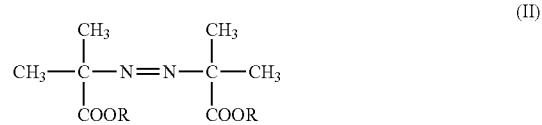

wherein R is alkyl or fluoroalkyl.

This invention also provides a process for manufacturing an optical fiber comprising preparing a (co)polymer by the above process for manufacturing a methacrylate (co)polymer comprising conducting polymerization while feeding a monomer (mixture) containing at least 90 wt % in total of at least one methacrylate monomer and a radical polymerization initiator represented by formula (II) into a reactor, which further comprises a feeding step of feeding a reaction mixture taken out from the reactor to a devolatilization step and a devolatilization step of separating and removing volatiles from the reaction mixture; and feeding the thus obtained (co)polymer and another polymer having a different refractive index to a multi-component spinning nozzle for spinning.

BRIEF DESCRIPTION OF THE DRAWINGS

FIG. 1 shows the relationships between a concentration of an initiator III and a polymerization temperature in this invention.

DETAILED DESCRIPTION OF PREFERRED EMBODIMENTS

In this invention, polymerization is conducted using the radical polymerization initiator represented by formula (II) (hereinafter, referred to as an "initiator II"), and for preparing a methyl methacrylate (co)polymer, it is preferable to conduct the polymerization using the radical polymerization initiator represented by formula (III) (hereinafter, referred to as an "initiator III"). Herein, a "radical polymerization initiator" is simply referred to as an "initiator".

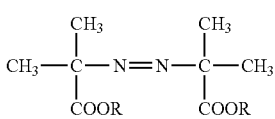

(II)

wherein R is alkyl or fluoroalkyl.

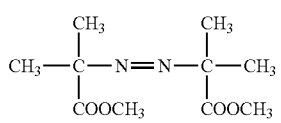

(III)

The initiator III may be decomposed as illustrated in the following reaction equation to give a radical IV

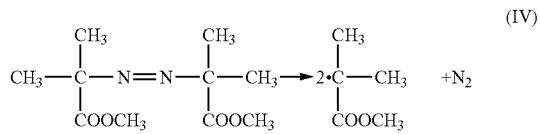

(IV)

Since the radical IV has the same structure as a methyl methacrylate structural unit, if for example in the polymerization of methyl methacrylate (hereinafter, referred to as "MMA") the initiator III is used, a polymethyl methacrylate (hereinafter, referred to as "PMMA") consisting of the entirely same structural units to its molecular ends is obtained. When polymerizing MMA with another monomer, the molecular ends of a copolymer produced are composed of the same structural unit to MMA which is one copolymerizing component of the monomer mixture. In other words, a polymer prepared using the initiator III has a uniform molecular structure. Furthermore, when polymerizing a methacrylate monomer other than MMA, the structural unit of the molecular end of a product obtained has a similar structure to the structural unit of the monomer. For this reason, a methacrylate polymer prepared using the initiator III can exhibit improved optical properties and, when used in an optical fiber, can provide the optical fiber having improved transmission performance.

An initiator generating the radical IV is not known among organic peroxides, but only the initiator III is known among azo initiators. The initiator III is, therefore, used in this invention. Decomposition rates for the initiator III at different polymerization temperatures are listed in, for example, the technical bulletin of Wako Pure Chemicals.

When preparing a polymer mainly comprising a structural unit of another methacrylate monomer, it is also preferable to select an initiator such that a radical generated from the initiator has the same structure as the structural unit of the monomer. For example, when preparing a 2,2,3,3-tetrafluoropropyl methacrylate polymer, it is preferable to use the initiator II where R in formula (II) is 2,2,3,3-tetrafluoropropyl.

In this invention, a chain transfer agent, preferably an alkyl mercaptan having 3 to 6 carbon atoms may be used for adjusting the molecular weight of a polymer produced. Residual mercaptan compounds may cause discoloration in thermal hysteresis during molding for a methacrylate polymer. It is, therefore, desirable to fully remove them during a devolatilization step. A mercaptan having 3 to 6 carbon atoms is easily handled because it is liquid at an ambient temperature and has a relatively higher vapor pressure, permitting us to remove most of them during the devolatilization step. As a result, an industrially advantageous and satisfactorily transparent methacrylate polymer with an extremely less amount of impurities can be prepared.

In this invention, it is preferable to conduct polymerization by a bulk or solution polymerization process. Further, it is preferable to conduct these polymerization continuously. Particularly, continuous bulk polymerization is most preferable since it does not require a solvent removing step and can provide a polymer with a minimum amount of impurities.

This invention will be described in detail. In the following description, the initiator III is used as the initiator II, but an initiator II in which R is other than methyl may be also used in a similar manner.

For the initiator III which is preferably used in this invention, it is preferable to remove foreign materials before use. For removing foreign materials, the initiator III is, for example, filtrated with a known filter. Since the initiator III is liquid at an ambient temperature, foreign materials can be readily removed. When using a commercially available initiator III, it usually contains materials other than the initiator III. Herein, an initiator purity, i.e., an initiator III concentration in the product, is preferably at least 95 wt %, more preferably at least 97 wt %. As used herein, the term "foreign materials" means dirts, dusts and so on. In particular, it is preferable to remove foreign materials having a size of 0.02 μm or more by filtration. As used herein, the term "materials other than the initiator III" means residual compounds contained in an initiator III product such as starting materials for synthesis and byproducts.

A monomer (mixture) used in this invention is a monomer (mixture) containing at least 90 wt % of a methacrylate monomer, preferably MMA or a mixture of at least 50 wt %, preferably at least 80 wt % of MMA and other monomer(s). Herein, one kind of methacrylate monomer or two or more kinds of methacrylate monomers may be used. When using two or more kinds of methacrylate monomers, the total amount of them is regarded as a content for a methacrylate monomer. Other monomers which may be combined with MMA are preferably, but not limited to, a variety of (meth) acrylates such as fluoroalkyl methacrylates, benzyl methacrylate and methyl acrylate.

When using a chain transfer agent in this invention, the above alkyl mercaptans having 3 to 6 carbon atoms are preferably used. Such alkyl mercaptans include n-propyl mercaptan, n-butyl mercaptan, t-butyl mercaptan and n-hexyl mercaptan. Among them, n-butyl mercaptan is preferable.

Such an initiator, a mercaptan and a monomer are fed in a reactor to initiate polymerization. In the process, they are preferably fed into the reactor after fully removing dissolved oxygen from the reactor by, for example, introducing inactive gas such as nitrogen gas or maintaining the system under a reduced pressure for a certain period. In addition, an initiator is usually fed by blending it just before the reactor with the other components to prevent these blended materials from being polymerized before introduction into the reactor.

The initiator, the mercaptan and the monomer fed into the reactor are blended by stirring, during which an inert gas such as nitrogen is preferably introduced into the reactor to pressurize the system to the vapor pressure of the reaction or higher.

In this invention, a known reactor may be used. It is preferable to use a reactor equipped with a jacket for internal heating or cooling. A known agitator may be used; preferably, a double-helical ribbon blade or a Max Blend blade (Sumitomo Jukikai Kogyo Inc.). The agitator may be preferably operated with an agitation power within the range of 1 to 5 kW/m$^3$.

The concentration of the initiator III fed into the reactor is preferably selected within the range satisfying the following equations (1) to (4) in order to conduct polymerization economically and stably:

$$\ln(A) \leq 105.4 - 45126/B \quad (1)$$

$$\ln(A) \leq 2545.2/B - 15.82 \quad (2)$$

$$\ln(A) \geq 225.9 - 102168.8/B \quad (3)$$

$$\ln(A) \geq 1300.0/B - 15.74 \quad (4)$$

wherein A is an initiator concentration (a molar ratio of the initiator/the monomer); B, is a polymerization temperature (° K); and ln is a symbol for a natural logarithm.

When conducting solution polymerization by further feeding an inert solvent into the reactor, the concentration of the initiator III is preferably selected within the range satisfying the following equations (5) to (8):

$$\ln\{A \times (1-C)^5\} \leq 105.4 - 45126/B \quad (5)$$

$$\ln\{A \times (1-C)^5\} \leq 2545.2/B - 15.82 \quad (5)$$

$$\ln\{A \times (1-C)^5\} \geq 225.9 - 102168.8/B \quad (7)$$

$$\ln\{A \times (1-C)^5\} \geq 1300.0/B - 15.74 \quad (8)$$

wherein C is the concentration of the inert solvent (the amount of the inert solvent (g)/the total amount of the monomer, the initiator, the chain transfer agent and the inert solvent fed into the reactor (g)) and A, B and ln are as defined for equations (1) to (4).

If the concentration of the initiator III is higher than the limit defined by equation (1) or (5), a reaction mixture may adhere to the reactor or may be postpolymerized outside of the reactor. It may cause an uneven molecular weight or may tend to generate foreign materials such as gel, resulting in deteriorated optical properties in a polymer obtained.

If the concentration of the initiator III is higher than the limit defined by equation (2) or (6), it becomes difficult to homogeneously blend the initiator and the monomer in the reactor, leading to poor operation stability. As a result, it may also cause an uneven molecular weight and foreign materials such as gel, resulting in deteriorated optical properties in a polymer produced.

If the concentration of the initiator III is lower than the limit defined by equation (3) or (7), oligomers mainly comprising dimers may be increased. Thus, for example, when a polymer obtained is used for a plastic optical fiber (hereinafter, referred to as an "optical fiber"), an absorption loss in the optical fiber may be increased.

If the concentration of the initiator III is lower than the limit defined by equation (4) or (8), oligomers mainly comprising dimers may be increased and a polymer yield may be reduced, leading to reduction in an economic efficiency.

FIG. 1 graphically shows the condition defined by equations (1) to (4). An initiator concentration and a polymerization temperature, i.e., a temperature of a reaction mixture during polymerization, are selected within the hatched range delimited by these four lines in the graph.

A polymerization temperature may be selected within the range of 110 to 160° C. If the polymerization temperature is higher than 160° C., dimers may be increased. The dimers cannot be completely separated by a usual devolatilization process, so that they may remain in a polymer, causing density fluctuation and thus deteriorated optical properties in the polymer. When attempting to remove the dimers for preventing the above problems, a reaction mixture must be heated to an elevated temperature during removing volatiles, which may cause discoloration in the polymer. The polymerization temperature is preferably 150° C. or lower, more preferably 140° C. or lower, further preferably 130° C. or lower for ensuring stabler preparation of a polymer having more improved optical properties.

On the other hand, a polymerization temperature lower than 110° C. may cause an uneven molecular weight of a polymer produced, leading to a reduced polymer yield.

A polymerization temperature is controlled to be maintained a desired constant temperature by, for example, adjusting a jacket temperature in the reactor or a temperature of a fed monomer.

When using continuous bulk polymerization as a polymerization process, a polymer content in a reaction mixture within a polymerization zone is preferably 30 wt % or higher for minimizing formation of dimers in the reaction mixture. For achieving an even molecular weight of a polymer in the reaction mixture and improving controllability of a polymerization temperature of the reaction mixture, a polymer content in the reaction mixture is preferably 70 wt % or less, more preferably 60 wt % or less. For stabler polymerization, a polymer content at a polymerization temperature of 140° C. or lower is preferably 50 wt % or less. A polymerization zone is herein a region where the initiator III and the monomer fed into the reactor are substantially homogeneously stirred and blended so that polymerization proceed to provide a reaction mixture.

For adjusting a molecular weight of a polymer, a chain transfer agent such as, generally, a mercaptan is added into a reactor. However, since it is necessary to remove most of the unreacted mercaptan during a devolatilization step for providing a methacrylate polymer having improved transparency, there has been a problem that a mercaptan having a higher number of carbon atoms has a lower vapor pressure, leading to increased duty in the devolatilization step. It is, therefore, preferable in this invention to use an alkyl mercaptan having 3 to 6 carbon atoms as a mercaptan having a relatively higher vapor pressure. If the carbon number is less than 3, handling the mercaptan becomes difficult because it can be easily vaporized at an ambient temperature. If the carbon number is more than 6, a vapor pressure is lower so that duty in the devolatilization step may be increased. There are no limitations for the amount of a mercaptan having 3 to 6 carbon atoms, and an amount appropriate for adjusting a molecular weight may be used. A particularly preferable chain transfer agent is n-butyl mercaptan. n-Butyl mercaptan has a boiling point almost equal to that of methyl methacrylate. n-Butyl mercaptan is, therefore, not separated from methyl methacrylate monomer and can be recovered as a solution in the monomer, even after removing materials having higher and lower boiling points from volatiles by distillation for reutilizing in the polymerization zone the volatiles recovered in the devolatilization step. Thus, using n-butyl mercaptan as an alkyl mercaptan, it can be reutilized.

However, volatiles recovered by a devolatilization process commonly used, occasionally contain unknown coloring materials except for a monomer and a mercaptan. Therefore, for reutilizing the volatiles, it is preferable to purify the volatiles by a process described later and extract the monomer (mixture) from the volatiles removed in a devolatilization step described later for reutilizing. The monomer (mixture) extracted in the volatile purification step may be recycled into the reactor or may be used in a different utility as a usual monomer (mixture).

For improving productivity of a polymer and minimizing contamination with dusts and/or polymer gels as much as possible in the present invention, it is preferable to continuously conduct polymerization, i.e., to continuously feed an initiator III, a monomer and preferably further a mercaptan compound selected from alkyl mercaptans having 3 to 6 carbon atoms into a reactor for polymerization while continuously taking out a reaction mixture from the reactor. In the process, an average residence time of the reaction mixture in a polymerization zone is preferably 1 to 6 hours, more preferably 2 to 6 hours.

After polymerization, preferably the reaction mixture taken out from the reactor is continuously fed with a known means such as a pump to a devolatilization step.

There are no limitations for a devolatilization process, and any known process can be employed. For example, volatiles can be removed by feeding the reaction mixture to a vent-type extruder. Although higher internal temperature of the extruder may be more effective for removing volatiles, it may cause deteriorating a polymer by staining the polymer obtained after removing the volatiles. It is, therefore, preferable to select the lowest internal temperature of the extruder within the range where the volatiles can be removed. Specifically, the internal temperature of the extruder is preferably about 190 to 260° C. Volatiles, as used herein, include unreacted monomers, diners and an unreacted mercaptan.

For improving productivity, it is preferable to continuously feed the reaction mixture to a devolatilization unit.

In this invention, the volatiles are purified preferably by a monomer purification process where a monomer containing a small amount of a mercaptan compound is purified using a catalyst containing at least one element selected from the group of copper, cobalt, nickel and manganese in the presence of molecular oxygen and of a compound containing at least chlorine.

A molecular oxygen source which is present in the purification process may be air, oxygen-rich air or oxygen.

The purification process may be in either liquid or gas phase.

For liquid phase purification, for example, a catalyst may be added to a monomer containing a small amount of a mercaptan compound in the presence of molecular oxygen and the mixture is, as necessary, stirred for a certain period. Molecular oxygen is preferably fed in an amount within the range of 0.1 to 50 mL/min per 100 mL of a reaction solution. The amount of the metal compound as a catalyst is preferably 0.01 to 1 parts by weight as a metal per one part by weight of the mercaptan compound contained in the monomer as an impurity. A purification temperature is preferably 0 to 80° C., more preferably 20 to 60° C.

On the other hand for gas phase purification, a vaporized monomer containing a small amount of mercaptan compound may be in contact with a catalyst under heating. The catalyst is usually used as a fixed bed, but may be used as a moving or fluidized bed. A contact period is preferably 0.1 to 10 sec. The monomer containing a mercaptan compound may be vaporized by, but not limited to, heating the monomer to its boiling point or higher at an ambient pressure or by vacuuming. The monomer can be diluted with an inert gas such as nitrogen, argon and steam.

Molecular oxygen is fed to a 0.01 to 0.5 fold volume to the volume of the vaporized solution to be purified, i.e., 0.01 to 0.5 molar ratio to the monomer containing a mercaptan compound. Purification is usually conducted under the desired conditions of a temperature of 100 to 200° C. and a pressure from several ten kPa (reduced pressure) to several hundred kPa (pressurized). The gaseous monomer after being in contact with the catalyst may be preferably trapped as a liquid by a usual process such as trapping it as a liquid under cooling or absorbing it with a solvent.

For the purification process, a catalyst containing at least one element selected from the group of copper, cobalt, nickel and manganese, may include compounds other than their chlorides when conducting purification in a liquid phase; for example, carboxylates such as formates, acetates, citrates, oleates and naphthenates; inorganic acid salts such as sulfates and nitrates; complexes such as acetyl acetonates; oxides; or mixtures thereof. These compounds may be commercially available.

For gas phase purification, a catalyst may be an oxide containing any of the above metallic elements. Particularly preferable catalysts are represented by a general formula $X_a Si_b Al_c O_d$ wherein Si, Al and O represent silicon, aluminum and oxygen, respectively; X represents at least one element selected from the group of copper, cobalt, nickel and manganese; a, b, c and d represent atom ratios for individual elements, provided that when a=1, b and c are 0 to 50 and d is an oxygen atom ratio required for satisfying atomic values of the above individual components.

The compound represented by the general formula $X_a Si_b Al_c O_d$ may be prepared by, but not limited to, a prior well known process where a catalyst precursor prepared by an appropriate method such as evaporation to dryness, precipitation and oxide mixing method is, as appropriate, formed into a desired shape by, e.g., tabletting and then heating it, as long as it does not cause significantly uneven distribution of components. Heating is preferably conducted usually at 200 to 700° C. for a duration of 30 min or longer. Starting materials for preparing these catalysts may be an appropriate combination of, for example, oxides, nitrides, carbonates, ammonium salts and hydroxides of individual elements.

A compound containing at least chlorine which is present during purification may be some form of chlorine-atom-containing compound such as molecular chlorine, hydrochloric acid, sodium chloride, sodium chlorate, calcium chloride, copper chloride, cobalt chloride, nickel chloride and manganese chloride. The compound may be fixed in the catalyst during catalyst preparation or may be present in a liquid to be purified or in a gas during purification. The amount of the compound containing at least chlorine may be in a small amount to the catalyst used, preferably 0.001 to 10 parts by weight as chlorine atom per 100 parts by weight of the catalyst. When the amount of the compound containing at least chlorine is less than 0.001 parts by weight, the reaction cannot be significantly promoted, while when more than 10 parts by weight is present, it may adversely affect a reaction unit and so on.

The monomer trapped as described above is distilled appropriately in the presence of a polymerization inhibitor such as hydroquinone and hydroquinone monomethyl ether to provide the high pure monomer containing a reduced amount of impurities such as disulfide derived from the mercaptan compound. There are no limitations for distillation conditions, but distillation is preferably conducted by heating the crude monomer to several ten ° C. under a reduced pressure.

When employing solution polymerization in this invention, a solvent is fed into a reactor in addition to a monomer and an initiator III. The solvent may be a known solvent such as toluene, xylenes, acetone, methyl ethyl ketone, methanol, ethanol, ethylbenzene, methyl isobutyl ketone and n-butyl acetate; particularly preferably, methanol, methyl ethyl ketone, ethylbenzene and n-butyl acetate. The amount of the solvent is preferably 40 wt % or less, more preferably 20 wt % or less, further preferably 10 wt % or less, to the total amount of the monomer, the initiator III, a chain transfer agent and the solvent.

The polymer content in the reaction mixture in the polymerization zone is preferably 40 to 70 wt % for industrially advantageous production. The solvent is preferably recovered together with volatiles in a devolatilization step. Recovery can be conducted by, but not limited to, supplying the reaction mixture to an appropriate apparatus such as a vent-type extruder, whose internal temperature is preferably about 190 to 260° C.

A polymer prepared by the process of this invention may be used to provide an optical fiber having improved optical properties.

There are no limitations for the structure of the optical fiber; specific examples are an SI type of optical fiber where a core and a sheath are concentrically piled in whose interface a refractive index abruptly changes, a GI type of optical fiber where a refractive index continuously changes from the center to the periphery, and an optical fiber where a refractive index changes stepwise from the center to the periphery. Since a polymer prepared according to this invention exhibits improved optical properties, it is preferably used in a part through which a light entering the optical fiber mainly passes, e.g, in a component constituting a core in an SI type of optical fiber.

For preparing an optical fiber, it is preferable to conduct spinning using a multi-component spinning nozzle discharging a plurality of materials to form a concentrically piled structure. Here, it is preferable to feed a polymer from which volatiles have been removed in advance, directly to the multi-component spinning nozzle for minimizing contamination of the polymer with dusts and reducing thermal hysteresis of the polymer as much as possible. A multi-component spinning nozzle with an at least two-layer structure may be used as appropriate. For example, a multi-component spinning nozzle having an at least three-layer structure is used for preparing an optical fiber where a refractive index changes stepwise from the center to the periphery. For preparing an SI type of optical fiber, spinning is conducted by feeding a core component and a sheath component to the inner and the outer layers, respectively, of a two-layer type of multi-component spinning nozzle. A process for preparing an optical fiber is not limited to that using a multi-component spinning nozzle; for example, a core component may be first spun and a sheath component may be then melt-applied to the outer surface of the core for preparing an SI type of optical fiber.

A sheath component for preparing an SI type of optical fiber may be, for example, a copolymer of vinylidene fluoride with a fluoroalkyl vinyl ether, a methacrylate, an acrylate, tetrafluoroethylene, hexafluoropropene and vinyl acetate. A copolymer of a methacrylate or acrylate with a fluoroalkyl methacrylate or fluoroalkyl acrylate may be also used. A polymer mainly comprising vinylidene fluoride is preferable; specifically, a copolymer of vinylidene fluoride and tetrafluoroethylene containing 75 to 99 wt % of vinylidene fluoride, a copolymer consisting of 75 to 95 wt % of vinylidene fluoride, 4 to 20 wt % of tetrafluoroethylene and 1 to 10 wt % of hexafluoropropene, and a copolymer consisting of 75 to 95 wt % of vinylidene fluoride, 4 to 20 wt % of tetrafluoroethylene and 1 to 5 wt % of vinyl fluoride.

A plastic optical fiber has been rapidly used in short-range optical transmission applications because it may be of a larger aperture and lighter and better in processability and workability than an optical fiber with an inorganic glass as a core material. Its optical transparency has been, however, not yet satisfactory. In practice, a plastic optical fiber has been, therefore, used for at most several ten meter optical transmission.

An optical transmission loss (a transmission loss) in the plastic optical fiber is mainly due to a polymer as a core material; specifically, considerably due to optical absorbance and Rayleigh scattering inherent in the polymer as well as optical absorption and scattering due to staining caused by impurities in the polymer or thermal hysteresis generated during preparation of the polymer. It is, therefore, a key for improving performance to prepare a plastic optical fiber using an optically transparent polymer as a core material.

Optical fibers in which a particular polymer is used as a core material for improving transmission performance have been disclosed in JP-A 2-158702, JP-A 63-94203 and JP-A 63-95402. JP-A 2-158702 has disclosed a plastic optical fiber comprising a polymer with a weight average molecular weight of 80,000 to 200,000 consisting of a homopolymer of methyl methacrylate and a copolymer of methyl methacrylate with another copolymerizable monomer as a core and a polymer with a lower refractive index than that of the core as a sheath containing butyl acetate up to 1000 ppm in the core.

However, butyl acetate in the optical fiber derives from butyl acetate as a solvent in preparation of a polymer in solution polymer. Satisfactory performance cannot be achieved with an optical fiber containing such a residual butyl acetate which increases a transmission loss.

JP-A 63-94203 has disclosed a core-sheath type of plastic optical fiber where a core component is a polymer comprising at least 80 wt % of polymethyl methacrylaie unit and a sheath component is a polymer having a refractive index lower at least by 2% than the core component polymer, characterized in that a transmission loss for a light having a wavelength of 400 nm is 400 dB/km or less and the amount of a polymer unit dimer in the core component polymer is 200 ppm or less; and has described that 200 ppm or less of the dimer allows a transmission loss to be reduced.

JP-A 63-95402 has disclosed a core-sheath type of plastic optical fiber where a core component is a polymer comprising at least 80 wt % of polymethyl methacrylate unit and a sheath component is a polymer having a refractive index lower at least by 2% than the core component polymer, characterized in that between residual methyl methacrylate and residual methyl methacrylate dimer there is a relationship represented by the following equation:

$$300 \geq 0.025 \times A + B \quad (V)$$

wherein A and B are the amounts of residual methyl methacrylate and residual methyl methacrylate dimer (ppm), respectively; and the amount of the residual methyl methacrylate contained in the core component polymer is 4000 ppm or less to the polymer consisting of methyl methacrylate unit in the core component polymer; and has described that a plastic optical fiber having improved transmission performance (light transmission performance) can be achieved by adjusting the amounts of the residual methyl methacrylate monomer and of the residual methyl methacrylate dimer to proper levels.

All of these optical fibers described above, however, comprise as a core component a polymer prepared by polymerization in the presence of a mercaptan chain transfer agent, leading to a significant problem that optical transmission performance in a plastic optical fiber is reduced due to a sulfur atom contained in the chain transfer agent.

Thus, JP-A 2-43506 has disclosed a plastic optical fiber comprising a core made of a polymer from methyl methacrylate as a main component and a sheath made of a polymer having a refractive index lower than that of the core, characterized in that the core is made of a polymer from methyl methacrylate as a main component, prepared by polymerizing a monomer mainly containing methyl methacrylate in the absence of a mercaptan chain transfer agent.

However, bulk polymerization in the absence of a mercaptan chain transfer agent provides a polymer having an excessively higher molecular weight, and therefore it become difficult to provide a polymer having improved spinning processability. Specifically, optical distortion is so increased during spinning that a plastic optical fiber having improved transmission performance cannot be provided. Therefore, polymerization is practically conducted by solution polymerization using an inert solvent. Use of an inert solvent may, however, lead to residual inert solvent in the polymer of the core, which causes reduction in transmission performance. Furthermore, use of an inert solvent requires a solvent separation/recovery step, resulting in a complexity of the process.

We have intensely investigated in an attempt to provide a plastic optical fiber having improved transmission performance, and have finally achieved a plastic optical fiber having considerably improved transmission performance by employing the following constitution.

This invention provides an optical fiber where a core material contains 200 ppm to 1000 ppm both inclusive of sulfur atoms bound to a (co)polymer while containing 5 ppm or less of sulfur atoms not bound to the (co)polymer. In the optical fiber of this invention, the core preferably contains 1 ppm or less of sulfur atoms not bound to the (co)polymer.

In the optical fiber of this invention, the (co)polymer in the core preferably has a molecular terminal structure, which is represented by the following formula (VI) derived from a radical initiator:

(VI)

wherein R is alkyl or fluoroalkyl.

In the optical fiber of this invention, the core material preferably comprises a homopolymer of methyl methacrylate or a copolymer of methyl methacrylate and other copolymerizable monomer.

In the optical fiber of this invention, the (co)polymer in the core preferably has a molecular terminal structure, which is represented by the following formula (VII) derived from a radical initiator:

(VII)

In the optical fiber of this invention, it is preferable that the core material comprises two or more (co)polymer whose copolymer composition and refractive index are mutually different, which are concentrically piled such that refractive indices are sequentially reduced from the core center to the periphery. In a preferable optical fiber, the core material is selected from the group consisting of a homopolymer of methyl methacrylate, a copolymer of methyl methacrylate and a fluoroalkyl methacrylate and a copolymer of methyl methacrylate and benzyl methacrylate.

The optical fiber of this invention is preferably prepared by assembling a plurality of islands, where each of the islands has a core and the islands are separated from each other by other (co)polymer.

This invention also provides an optical fiber cable comprising the above optical fiber and a coating layer which is formed on the outer surface of the optical fiber.

This invention also provides an optical fiber cable with a plug comprising the optical fiber cable and a plug being attached to an end of said optical fiber.

This invention also provides a process for manufacturing an optical fiber comprising the steps of:

feeding a polymerization initiator, an alkyl mercaptan having 3 to 6 carbon atoms and a monomer or a mixture of two or more monomers into a reactor to form a reaction mixture containing a (co)polymer;

feeding the reaction mixture into a vent-type devolatilization extruder by directly spraying the mixture to a screw in an inlet in the vent-type devolatilization extruder under a reduced pressure through a small hole or slit for removing volatiles to provide a (co)polymer; and forming an optical fiber using the (co)polymer as a core material, where a feed rate of the reaction mixture to the vent-type devolatilization extruder and screw diameter and screw revolution speed in the vent-type devolatilization extruder satisfy the following relationship of equation (9):

$$Q \leq 0.002 \times \phi^2 \times \sqrt{N} \qquad (9)$$

wherein Q is a feed rate of the reaction mixture (L/hr); $\phi$ is a screw diameter (mm); and N is a screw revolution speed (rpm). In the above manufacturing process, it is preferable that one of the monomers fed into the reactor is methyl methacrylate.

This invention also provides the above process for manufacturing an optical fiber in which the core material comprises a homopolymer of methyl methacrylate or a copolymer of methyl methacrylate and other copolymerizable monomer, comprising the steps of:

feeding a polymerization initiator, an alkyl mercaptan having 3 to 6 carbon atoms and methyl methacrylate monomer or a mixture of methyl methacrylate and other copolymerizable monomer into a reactor to produce a reaction mixture containing a methyl methacrylate (co)polymer in 30 to 60 wt %;

feeding the reaction mixture preheated to 170 to 205° C. and compressed to a pressure equal to or higher than a vapor pressure of methyl methacrylate at the preheating temperature into a vent-type devolatilization extruder for removing volatiles to obtain a methyl methacrylate (co)polymer; and forming an optical fiber using the (co)polymer as a core material, where the reaction mixture is fed into a vent-type devolatilization extruder by directly spraying the mixture to a screw in an inlet in the vent-type devolatilization extruder under a reduced pressure through a small hole or a narrow slit; and at least in the most downstream vent of the vent-type devolatilization extruder, a temperature and a pressure are 230 to 270° C. and 50 Torr or less, respectively.

This invention will be described in detail.

A polymer constituting the core in the optical fiber of this invention is preferably, but not limited to, a (co)polymer comprising a (meth)acrylate monomer, more preferably a homopolymer of methyl methacrylate monomer or a copolymer of methyl methacrylate and another copolymerizable monomer. Monomers copolymeriable with methyl methacrylate preferably include, but not limited to, various (meth)acrylate monomers such as fluoroalkyl methacrylates, benzyl methacrylate and methyl acrylate. A preferable fluoroalkyl methacrylate is 2,2,3,3-tetrafluoropropyl methacrylate because of its good copolymerizability with methyl methacrylate. For a methyl methacrylate copolymer, it preferably contains 50 wt % or more, more preferably 60 wt % ore more, particularly preferably 80 wt % or more of methyl methacrylate unit.

A polymer constituting a core is generally prepared by heating, for a methyl methacrylate (co)polymer, methyl methacrylate monomer or a mixture of methyl methacrylate monomer and another copolymerizable monomer in a batch style or continuously for a certain period in the presence of a radical polymerization initiator and a mercaptan chain transfer agent for polymerization reaction; and then removing volatiles such as unreacted monomers from the reaction mixture obtained. A proper inert solvent may be, as appropriate, used to an adequately low level not to impede transmission performance, preferably 20 wt % or less, more preferably 10 wt % or less.

A polymer is preferably prepared as follows. While reactants are polymerized in a complete mixing type of reactor with substantially homogenous stirring at a polymerization temperature of 110 to 160° C. and with an average residence time of 2 to 6 hrs to continuously produce a reaction mixture, the polymer content of which is preferably 30 to 70 wt %, more preferably 30 to 60 wt %.

There are no limitations for a devolatilization method and any known process may be employed. It is essential in this invention that sulfur-containing components (as sulfur atoms) which are not bound to the polymer are contained in the polymer in 5 ppm or less after devolatilization of the reaction mixture. For achieving this purpose, it is preferable to adjust a capacity of the devolatilization step and the amount of the reaction mixture fed to the devolatilization step.

Volatiles can be effectively removed, for example, using the vent-type extruder described in JP-B 52-17555. It is here preferable that a reaction mixture preferably containing a polymer in 30 to 70 wt % is preheated to 170° C. or higher; the mixture is then directly sprayed to a screw in an inlet of the vent-type extruder through a narrow opening such as a small hole and a slit; most of volatiles are separated and recovered in the first vent under a pressure of 500 Torr or lower; and then the residual volatiles are removed in the second vent downstream of the first vent at 200 to 270° C., preferably 230 to 270° C. under a pressure of 50 Torr or lower. The residual volatiles may be further removed using the third vent downstream of the above vents at 230 to 270° C. under a pressure of 50 Torr or lower. Volatiles, as used herein, include unreacted monomers, dimers and an unreacted mercaptan.

In the above process, more than 70 wt % of the polymer content may make the polymerization reaction difficult to conduct stably, while less than 30 wt % increases duty for removing volatiles and thus provides no industrial advantages.

A preheating temperature lower than 170° C. causes increase in a caloric value required for removing volatiles, so that it is difficult to produce a polymer having a composition according to this invention. A preheating temperature higher than 205° C. is advantageous for removing volatiles, but tends to cause formation/adhesion of colored materials probably due to sulfur-containing compounds in a preheater surface in contact with the liquid phase and the colored materials are entrained in the polymer, leading to increase in a transmission loss. A preheating temperature is preferably 185 to 205° C.

When using a single screw vent-type extruder as a vent-type extruder, it is preferable to select that the following relationship is satisfied between a feed rate of the reaction mixture and a size of the vent-type extruder, for ensuring that the content of the sulfur-containing compounds not bound to the polymer is 5 ppm or less:

$$Q \leq 0.002 \times \phi^2 \times \sqrt{N} \qquad (9)$$

wherein Q is a feed rate of the reaction mixture (L/hr); $\phi$ is a screw diameter (mm); and N is a screw revolution speed (rpm).

In particular, when the condition is satisfied and a preheating temperature of the reaction mixture fed to the vent-type extruder is 170° C. or higher, the sulfur-containing components can be significantly effectively removed.

A polymer in this invention can be prepared either in a batch style or continuously, as long as the content of the sulfur-containing components not bound to the polymer can be 5 ppm or less in the polymer after removing volatiles.

In preparation of a polymer in this invention, mercaptan chain transfer agents for adjusting a polymer molecular weight is used for adjusting a viscosity in a melting step during shaping the polymer as an optical fiber and for preventing increase in scattering elements due to structure formation during shaping. Among the chain transfer agents, sulfur components which are bound to the polymer by the chain transfer reaction do not increase an optical absorption loss when being heated or a scattering loss when being humidified, but rather improve its thermal decomposition resistance. On the other hand, the residual mercaptan and disulfide compound in the polymer which are not bound to the polymer may be easily discolored by heating. Therefore, thermal hysteresis in a spinning step may easily cause discoloration and an absorption loss may be increased particularly in a wavelength range of 600 nm or lower. In an optical fiber prepared after spinning, the mercaptan and the disulfide compound cause increase in an absorption loss at an elevated temperature and induce scattering loss in a higher humidity. Such residual mercaptan and disulfide compound significantly hamper the formation of an optical fiber having improved transmission performance and the retention of optical transmission properties for a long time.

It is, therefore, necessary in this invention that a mercaptan chain transfer agent is used for controlling a polymer molecular weight within a proper range; the content of sulfur atoms which are bound to the polymer in the core is 200 ppm to 1000 ppm both inclusive for improving thermal decomposition resistance of the polymer; and the content of sulfur atoms which are not bound to the polymer is 5 ppm or less for preventing discoloration.

The content of sulfur atoms which are bound to the polymer is preferably 400 ppm to 800 ppm both inclusive. If the content of sulfur atoms which are bound to the polymer is too low, the polymer has an inadequate thermal decomposition resistance, so that, for example, when preparing an optical fiber by melt spinning, the melt viscosity of the polymer is too high to be difficult to conduct spinning. On the other hand, if the content of sulfur atoms is too high, the melt viscosity is too low to be difficult to conduct spinning.

Sulfur atoms which are not bound to a polymer, i.e., coloring materials such as an unreacted mercaptan and a disulfide compound formed by a reaction of the mercaptan, must be removed to be 5 ppm or less of the total content as sulfur atoms in the above devolatilization step. The content is preferably 3 ppm or less, more preferably 1 ppm or less, ideally an undetectable level.

Mercaptans which may be satisfactorily used in this invention include alkyl mercaptans such as n-propyl, n-butyl, t-butyl, n-hexyl, n-octyl and n-dodecyl mercaptans. Mercaptans having a relatively higher vapor pressure are preferably used because use of mercaptans having a relatively lower vapor pressure causes increase in duty in the devolatilization step. In this regard, alkyl mercaptans having 3 to 6 carbon atoms are preferable, including n-butyl and t-butyl mercaptans. Furthermore, n-butyl mercaptan is most preferable because a mercaptan having a large chain transfer constant can minimize its amount for use.

In the case of using a methacrylate polymer as a core in this invention, the polymer can exhibit further improved transmission performance when, besides the above condition for the sulfur-atom content, a molecular terminal structure derived from an initiator has the structure represented by formula (VI) mentioned below, particularly, by formula (VII) for a methyl methacrylate polymer. In the formulae, n is a natural number of 1 or more.

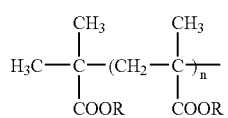

wherein R is alkyl or fluoroalkyl.

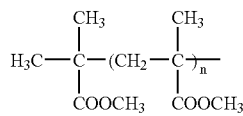

The molecular terminal structure derived from the radical initiator represented by formula (VII) indicates that the molecular terminal has the same structure as that of methyl methacrylate monomer. Thus, excellent transmission performance of methyl methacrylate can be fully utilized without receiving influence of optical absorption or optical scattering due to a different molecular structure derived from an initiator.

In the prior art, a terminal structure of a polymer derived from an initiator has not been studied because an initiator is used in an amount of only several ten ppm for preparation of a polymer. However, slight increase in a transmission loss may be critical in terms of performance in an application where an extreme transparency is required such as an optical fiber. We have pursued a material having quite excellent transmission performance; have intensely investigated focusing on a completely novel viewpoint, i.e., a terminal structure of the polymer derived from the polymerization initiator; and thus have achieved this invention.

An initiator which can provide a polymer having a terminal structure represented by formula (VII) may be, for example, dimethyl 2,2'-azobis(2-methylpropionate) (formula (III))

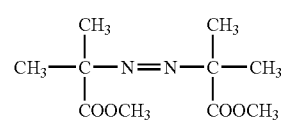

Besides an initiator terminal having the same structure as methyl methacrylate structure, use of dimethyl 2,2'-azobis (2-methylpropionate) may provide an additional advantage. In general, an initiator is decomposed to generate radicals for initiating polymerization reaction while part of the radical are recombined to form a stable compound which does not contribute to the polymerization reaction. For dimethyl 2,2'-azobis(2-methylpropionate), recombination of radicals generated by decomposition mostly forms methyl methacrylate monomer which is used in the present invention. Thus, a polymer with an extremely small amount of impurities other than the monomer can be prepared.

In this invention, transmission performance may be further improved when a weight average molecular weight in a polymer which constitutes a core satisfies to be 70,000 to 100,000 both inclusive.

A weight average molecular weight of 70,000 to 100,000 both inclusive is important for achieving good fluidity at a relatively lower temperature during spinning. Specifically, an optical fiber is preferably prepared by a process comprising separately feeding to multi-component spinning nozzle a polymer for a core and a separately-prepared polymer having a refractive index lower than that of the core polymer in fused forms for spinning. In the process, heating the polymer to an elevated temperature increases a transmission loss due to discoloration caused by, for example, decomposition of components. It is, therefore, required to fuse the materials at a temperature as low as possible for a short heating duration. Even at a relatively lower temperature, spinning with a higher melt viscosity may deteriorate optical transmission performance due to a residual optical distortion. It is, therefore, necessary to ensure good fluidity at a relatively lower temperature.

It is, therefore, preferable that for a methyl methacrylate polymer, a weight average molecular weight is 100,000 or less for melt spinning at a relatively lower temperature. A polymer with a molecular weight of 100,000 or less does not require heating to a very high temperature, so that an optical absorption loss due to discoloration can be minimized and optical distortion can be avoided because of its relatively lower melt viscosity, resulting in satisfactory transmission performance. A polymer with a weight average molecular weight of 70,000 or more can exhibit good transmission performance and provide a durable optical fiber because the polymer has an adequate mechanical strength against, e.g., bending.

There are no limitations for the structure of the optical fiber of this invention; specific examples are an SI type of optical fiber where a core and a sheath are concentrically piled as a two-layer structure in whose interface a refractive index abruptly changes, a GI type of optical fiber where a refractive index of a core continuously changes from its center to periphery, and a multi-layer optical fiber consisting of a plurality of layers where a refractive index of a core decreases stepwise from its center to periphery.

A multi-layer optical fiber preferably has a structure where a core consists of piled and non-mixed layers made of (co)polymers having different refractive indices. In the structure, between adjacent layers it is also possible to form a mixed layer of the (co)polymers constituting the adjacent layers. In this invention, a part or all of the (co)polymer constituting the core is made of the polymer described above, preferably of a methyl methacrylate polymer. For the (co)polymers constituting the core of the multi-layer optical fiber, it is preferable to use (co)polymers which are produced from the same monomer but have different copolymer composition ratios as adjacent non-mixed layers, because a scattering loss can be minimized in the interface between the non-mixed layers.

A GI type or multi-layer optical fiber can consist of either a core alone or a core and a sheath on the periphery of the core, which is made of a polymer having a refractive index lower than that of the periphery of the core. The sheath may consist of a plurality of layers.

An optical fiber of this invention may be a sea-island type where mutually separated multiple islands are combined through a common sea. In the sea-island type optical fiber, an island may consist either of a core alone or of a core and a sheath. Each island may have a similar structure to the above described multi-layer optical fiber. A diameter of each island is preferably 250 μm or less, more preferably 200 μm or less for minimizing leakage light out of the optical fiber (bend loss) when the optical fiber is bent. The sea-island type optical fiber can be used for multiplex communication by guiding different optical signals to individual islands.

In this invention, a protective layer may be formed on the outer surface of an optical fiber of core-sheath structure or of a sea-island type optical fiber.

Materials which may be used for a sheath or protective layer include copolymers of vinylidene fluoride with a fluoroalkyl vinyl ether, a methacrylate, an acrylate, tetrafluoroethylene, hexafluoropropene and vinyl acetate. A copolymer of a methacrylate or acrylate with a fluoroalkyl methacrylate or fluoroalkyl acrylate may be also used.

A polymer mainly comprising vinylidene fluoride or a fluoroalkyl methacrylate is preferable. Examples for a polymer mainly comprising vinylidene fluoride include a copolymer of vinylidene fluoride and tetrafluoroethylene, which contains 75 to 99 wt % of vinylidene fluoride, a copolymer consisting of 75 to 95 wt % of vinylidene fluoride, 4 to 20 wt % of tetrafluoroethylene and 1 to 10 wt % of hexafluoropropene, and a copolymer consisting of 75 to 95 wt % of vinylidene fluoride, 4 to 20 wt % of tetrafluoroethylene and 1 to 5 wt % of vinyl fluoride. Examples for a polymer mainly comprising a fluoroalkyl methacrylate include copolymers of a short-chain fluoroalkyl methacrylate, a long-chain fluoroalkyl methacrylate and methyl methacrylate (or methacrylic acid) and copolymers of methyl methacrylate with a long-chain fluoroalkyl methacrylate or with methacrylic acid.

A sea material in a sea-island type optical fiber may be, for example, selected from the polymers as described above for a sheath or protective layer.

An optical fiber of this invention may be used as an optical fiber cable by placing a coating layer on its periphery. The coating layer may be made of a conventionally-used material such as Nylon 12, polyvinyl chloride, poly(chlorotrifluoroethylene) copolymers, polyethylene, polyurethane and perprene.

The optical fiber may be used as an optical fiber cable with a plug by placing a plug on an end of an optical fiber cable. A well-known plug may be used.

An optical fiber of this invention may be prepared by a known process. For preparing an SI-, GI- or multi-layer type optical fiber, spinning is conducted preferably using a multi-component spinning nozzle which concentrically discharge a plurality of materials to form a piled structure. A multi-component spinning nozzle with an at least two-layer structure may be used as appropriate. For example, a multi-component spinning nozzle with an at least three-layer structure is used for preparing an optical fiber where a refractive index changes stepwise from the center to the periphery. For preparing an SI type of optical fiber, spinning is conducted by feeding a core component and a sheath component to the inner and the outer layers, respectively, of a two-layer type of multi-component spinning nozzle. A process for preparing an optical fiber is not limited to that using a multi-component spinning nozzle; for example, a core component may be first spun and a sheath component may be then melt-applied to the outer surface of the core for preparing an SI type of optical fiber. For preparing a sea-island type optical fiber, a known multi-component spinning nozzle may be preferably used for spinning.

This invention will be more specifically described with reference to Examples.

Properties for a polymer which was used as a core material were determined as follows.

A) Determination of a Sulfur-containing Component Content in a Polymer i) Determination of a Content of Sulfur Atoms which are Bound to a Polymer Determination was carried out using a Doman microcoulometric titrator MCTS-130. Specifically, a calibration curve was plotted by a measurement for a standard sample whose sulfur-atom concentration was known. Then, a polymer used as a core material was dissolved in a 10-fold volume of acetone and the solution was added dropwise to methanol to precipitate the polymer. The polymer alone was separated and collected, and dried to give a polymer sample. After measurement for the polymer sample, a measured value was read from the calibration curve. The value was then converted into a value per a unit quantity of the polymer to give a content of sulfur atoms which are bound to a polymer.

ii) Determination of a Content of Sulfur Atoms which are not Bound to a Polymer

It was determined using a 5890 SERIES II gas chromatograph (HP Company) with a TC-WAX column (G. L. Science Inc.) with a length of 30 m, an inner diameter of 0.53 mm and a film thickness of 1.0 μm. A flame photometric detector which is highly sensitive to sulfur was used to quantitatively analyze residual n-butyl mercaptan or n-octyl mercaptan in a polymer and a disulfide compound formed by reaction between these two mercaptan molecules. This quantitative analysis was conducted by plotting a calibration curve by a measurement for a standard sample solution in acetone whose sulfur concentration was known; conducting measurement for a sample solution in which a polymer is dissolved to about 13 wt/vol %; and converting a value obtained from the calibration curve into a value for sulfur atoms to give a content of sulfur atoms which are not bound to the polymer.

A sulfur-atom content was the total of sulfur-atom equivalents for n-butyl mercaptan and di-n-butyl disulfide when using n-butyl mercaptan and for n-octyl mercaptan and di-n-octyl disulfide when using n-octyl mercaptan.

B) Determination of a Molecular Weight by GPC

An HLC-8020 gas chromatograph (TOSOH Company) was used, which was equipped with two GMHXL columns (TOSOH Company). A calibration curve was plotted using THF as a solvent and a TSK standard polystyrene (TOSOH Company). A sample was a 0.1 g/dL solution prepared by still dissolution.

A weight average molecular weight Mw and a ratio Mw/Mn, wherein Mw and Mn are a weight average molecular weight and a number average molecular weight, was determined with a commercially available GPC data processor (TOSOH data processor SC-8010).

C) Repetitive Bending Test

Bending was repeated with a bending radius of 15 mm and an angle of 180° and a bending number until an optical fiber core was broken was recorded.

D) Determination of Residual Monomer and Residual Dimer Amounts

After preparing an optical fiber by spinning, only the core component of the fiber was taken out to give a measurement sample, which was then subject to determination by a gas chromatography.

EXAMPLE 1

To a purified MMA were added dimethyl 2,2'-azobis(2-methylpropionate) (Wako Pure Chemicals V-601, purity: 99 wt %) in a ratio of $1.5 \times 10^{-5}$ mol/1 mol monomer and n-butyl mercaptan (ELF ATOCHEM NORTH AMERICA INC, purity: 99.5 wt %) in a ratio of $1.75 \times 10^{-3}$ mol/1 mol monomer, respectively, and the mixture was continuously fed into a reactor in which a polymerization temperature was controlled to 135° C. and the mixture was stirred and mixed with a stirring blade. In the polymerization, an average residence time of the reaction mixture in a polymerization zone was set to 4 hours.

After polymerization, the reaction mixture was continuously taken out from the reactor, and was continuously sent to a vented extruder with a pump for separating and removing volatiles therefrom to obtain a polymer.

A polymer and a dimer contents in the reaction mixture were 44 wt % and 0.05 wt %, respectively, immediately after taking out it from the reactor. In the polymer obtained after removing volatiles from the reaction mixture, a residual monomer and a dimer contents were 0.1 wt % and 0.03 wt % or less, respectively. This polymer exhibited a weight average molecular weight (Mw) of 95,000 by a gel permeation chromatography (GPC) and a ratio of weight average molecular weight/number average molecular weight (Mw/Mn) was 2.0. Thus, the polymer had a considerably narrow molecular weight distribution. A heating loss temperature determined by a thermobalance was 286° C. and a glass transition point determined with a differential scanning calorimeter was as high as 120° C., indicating that the polymer had good thermal properties. During a continuous operation for 360 hours, the operation was quite stable and in observation of the inside of the reactor after the operation, polymer adhesion to the reactor and foreign material formation were not obserbed.

Subsequently, using a two-layer multi-component spinning nozzle, while the above polymer was fed as a core material to the inner layer of the two-layer multi-component spinning nozzle and separately prepared 2,2,2-trifluoroethyl methacrylate polymer was fed as a sheath material to the outer layer of the multi-component spinning nozzle, a melt multi-component spinning was conducted at a multi-component spinning nozzle temperature of 210° C. to obtain an optical fiber having a core-sheath structure.

The optical fiber was evaluated for transmission performance. This optical fiber exhibited transmission losses of 70, 62 and 133 dB/km at wavelengths of 520, 570 and 650 nm, respectively, indicating that the optical fiber had significantly excellent optical properties with a small transmission loss.

EXAMPLE 2

An optical fiber was prepared in a similar method as described in Example 1, except that a monomer mixture of 98 wt % of MMA and 2 wt % of methyl acrylate was used as a monomer, an initiator concentration was $1.3 \times 10^{-5}$ (mol)/monomer (mol) and a polymerization temperature was 150° C.

A polymer content in the reaction mixture was 52 wt %, immediately after taking out it from the reactor. In the polymer obtained after separating and removing volatiles from the reaction mixture, a residual monomer content in the polymer was 0.09 wt %.

The optical fiber exhibited transmission losses of 82, 78 and 138 dB/km at wavelengths of 520, 570 and 650 nm, respectively, indicating that the optical fiber had significantly excellent optical properties.

EXAMPLES 3 to 8

Optical fibers were prepared and evaluated in a similar method as described in Example 1. The reaction conditions are shown in Table 1 together with those for Examples 1 and 2. Conditions other than those shown in Table 1 were the same as described in Example 1.

EXAMPLE 9

An optical fiber was prepared in a similar method as described in Example 1, except that n-octyl mercaptan was used instead of n-butyl mercaptan. Transmission losses were 120, 87 and 135 dB/km at wavelengths of 520, 570 and 650 nm, respectively. A transmission loss in a short wavelength range was slightly higher due to insufficient removal of the mercaptan while the initiator contributed to improvement in a transmission loss, especially in a long wavelength range. The results are shown in Table 1.

TABLE 1

| Exam. No. | Monomer composition | | Polymerization conditions | | | | | Transmission loss at 570 nm (dB/km) |
|---|---|---|---|---|---|---|---|---|
| | MMA* (wt %) | Comonomer (wt %) | Radical initiator (mol/ monomer 1 mol) | Chain transfer agent** (mol/ monomer 1 mol) | Polymerization temperature (° C.) | Residence time (hr) | Polymer content (wt %) | |
| 1 | 100 | 0 | $1.5 \times 10^{-5}$ | $1.75 \times 10^{-3}$ | 135 | 4 | 44 | 62 |
| 2 | 98 | MA* 2 | $1.3 \times 10^{-5}$ | $1.75 \times 10^{-3}$ | 150 | 4 | 52 | 78 |
| 3 | 100 | 0 | $1.8 \times 10^{-5}$ | $1.70 \times 10^{-3}$ | 130 | 3.5 | 44 | 61 |
| 4 | 100 | 0 | $1.8 \times 10^{-5}$ | $2.2 \times 10^{-3}$ | 125 | 4 | 44 | 61 |
| 5 | 100 | 0 | $1.6 \times 10^{-5}$ | $1.75 \times 10^{-3}$ | 135 | 4 | 47 | 61 |
| 6 | 100 | 0 | $1.0 \times 10^{-5}$ | $1.5 \times 10^{-3}$ | 130 | 3 | 35 | 72 |
| 7 | 98 | EA* 2 | $3.2 \times 10^{-5}$ | $2.0 \times 10^{-3}$ | 150 | 2 | 56 | 81 |
| 8 | 100 | 0 | $1.5 \times 10^{-5}$ | $2.2 \times 10^{-3}$ | 120 | 5 | 45 | 64 |
| 9 | 100 | 0 | $1.6 \times 10^{-5}$ | $1.75 \times 10^{-3}$ | 135 | 4 | 47 | 87 |

*MMA: methyl methacrylate, MA: methyl acrylate, EA: ethyl acrylate
**Chain transfer agent: n-butyl mercaptan in Examples 1 to 8 and n-octyl mercaptan in Example 9

COMPARATIVE EXAMPLE 1

An optical fiber was prepared in a similar method as described in Example 1, except that 2,2'-azobis(2,4,4-trimethylpentane) was used as an initiator and the amount of the initiator was $1.2 \times 10^{-5}$ (mol)/MMA (mol).

A polymer content in the reaction mixture was 46 wt % immediately after taking out it from the reactor. In the polymer obtained after separating and removing volatiles from the reaction mixture, a residual monomer and a dimer contents were 0.1 wt % and 0.03 wt %, respectively. The optical fiber exhibited transmission losses of 80 and 140 dB/km at wavelengths of 570 and 650 nm, respectively, indicating that the optical fiber had insufficient optical properties.

COMPARATIVE EXAMPLE 2

Polymerization was conducted for 48 hours under the monomer composition and the polymerization conditions shown in Table 2 while the other conditions were similar as described in Example 1.

As seen from the table, a polymer content in a reaction mixture, however, considerably varied in a range of 42 wt % to 50 wt % immediately after taking out it from a reactor, and a polymerization temperature was also unstable, i.e., stable operation was difficult. When observing the inside of the reactor after operation, there was found a large amount of gelled polymer attachment on the reactor inside.

For an optical fiber prepared in a similar manner as described in Example 1 with the polymer thus obtained, a diameter was not uniform with many locally thicker parts. Therefore, the level of the optical fiber was insufficient for industrial use.

COMPARATIVE EXAMPLE 3

Polymerization was conducted for 24 hours under the monomer composition and the polymerization conditions shown in Table 2 while the other conditions were similar as described in Example 1.

As seen from Table 2, a polymerization temperature was, however, unstable in a range of 130 to 140° C. and a polymer content in a reaction mixture considerably varied in a range of 40 wt % to 55 wt % immediately after taking out it from a reactor, i.e., stable operation was difficult. When observing the inside of the reactor after operation, there was found a large amount of gelled polymer attachment on the reactor inside.

For an optical fiber prepared in a similar manner as described in Example 1 with the polymer thus obtained, polymer lumps with a higher molecular weight (gel) were unevenly distributed, and a diameter was not uniform, i.e., there were alternately thicker and thinner parts Therefore, the level of the optical fiber was insufficient for industrial use.

COMPARATIVE EXAMPLE 4

Polymerization was conducted for 100 hours under the monomer composition and the polymerization conditions shown in Table 2 while the other conditions were similar as described in Example 1.

In the polymer obtained after separating and removing volatiles from the reaction mixture, a residual monomer and a dimer contents were 0.1 wt % and 0.5 wt %, respectively, indicating that it was a polymer with a considerably higher dimer content.

An optical fiber prepared in a similar manner as described in Example 1 using the polymer thus obtained exhibited transmission losses of 140, 95 and 140 dB/km at wavelengths of 520, 570 and 650 nm, respectively. Thus, a transmission loss was particularly higher in a short wavelength range.

COMPARATIVE EXAMPLE 5

Polymerization was conducted for 100 hours under the monomer composition and the polymerization conditions shown in Table 2 while the other conditions were similar as described in Example 1.

In the polymer obtained after separating and removing volatiles from the reaction mixture, a residual monomer and a dimer contents were 0.2 wt % and 0.6 wt %, respectively, indicating that it is a polymer with a considerably higher dimer content. Furthermore, a polymer content in a polymerization zone was low, i.e., productivity for the polymer was low.

An optical fiber prepared in a similar manner as described in Example 1 using the polymer thus obtained exhibited transmission losses of 142, 95 and 140 dB/km at wavelengths of 520, 570 and 650 nm, respectively. Thus, a transmission loss was particularly higher in a short wavelength range.

TABLE 2

| Comp. Exam. No. | Monomer composition | | | Polymerization conditions | | | Transmission loss at 570 nm (dB/km) |
|---|---|---|---|---|---|---|---|
| | MMA* (wt %) | Radical initiator (mol/monomer 1 mol) | Chain transfer agent** (mol/monomer 1 mol) | Polymerization temperature (° C.) | Residence time (hr) | Polymer content (wt %) | |
| 1 | 100 | $1.2 \times 10^{-5}$ | $1.75 \times 10^{-3}$ | 135 | 4 | 46 | 80 |
| 2 | 100 | $4.3 \times 10^{-5}$ | $1.80 \times 10^{-3}$ | 110 | 3 | 42*–50 | — |
| 3 | 100 | $8.7 \times 10^{-5}$ | $1.50 \times 10^{-3}$ | 130–140 | 1 | 40–55 | — |
| 4 | 100 | $8.7 \times 10^{-5}$ | $1.70 \times 10^{-3}$ | 165 | 5 | 49 | 95 |
| 5 | 100 | $2.2 \times 10^{-5}$ | $1.75 \times 10^{-3}$ | 150 | 5 | 25 | 95 |

*MMA: methyl methacrylate
**Chain transfer agent: n-butyl mercaptan

EXAMPLE 10

To a purified MMA were added dimethyl 2,2'-azobis(2-methylpropionate) (Wako Pure Chemicals V-601, purity: 99 wt %) in a ratio of $1.8 \times 10^{-5}$ mol/1 mol monomer and n-butyl mercaptan (ELF ATOCHEM NORTH AMERICA INC, purity: 99.5 wt %) in a ratio of $1.8 \times 10^{-3}$ mol/1 mol monomer, respectively, and the mixture was continuously fed into a complete-mixing type reactor in which a polymerization temperature was controlled to 130° C. and the mixture was stirred and mixed with a stirring blade. In the polymerization, an average residence time of the reaction mixture in a polymerization zone was set to 3.6 hours.

While the reaction mixture was continuously taken out from the reactor, the mixture heated to 190° C. was continuously sent to a rear-vented type of 3-vent single-screw devolatilization extruder having a screw diameter of 40 mm using a pump at a rate of 15 L/hr for separating and removing volatiles to obtain a polymer. A pressure in an inlet (rear vent: the first vent) was 100 Torr, while pressures in the second and the third vents were 50 Torr. An extruder temperature in the inlet was set to 220° C. while those in the second and the third vents to 240° C. A screw revolution speed was 60 rpm. A polymer content immediately after taking out the mixture from the reactor was 45 wt %, which was calculated from the amount of the reaction mixture fed and the amount of the polymer collected after removing the volatiles. The polymer extruded without being exposed to the air from the tip of the extruder was continuously and directly fed to a two-layer multi-component spinning nozzle. While the above polymer was fed as a core material to the inner layer of the two-layer multi-component spinning nozzle and a separately prepared polymer of 51 wt parts of 2,2,2-trifluoroethyl methacrylate, 30 wt parts of 1,1,2,2-tetrahydroperfluorodecyl methacrylate, 18 wt parts of methyl methacrylate and 1 wt part of methacrylic acid was fed as a sheath material to the outer layer of the nozzle, a melt multi-component spinning was conducted under a constant nozzle pressure of 30 kg/cm² and at a nozzle temperature of 220° C. to obtain an optical fiber having a core-sheath structure whose fiber diameter was 1000 µm.

The optical fiber thus obtained was evaluated for transmission performance and residual volatiles in the core material.

Only the polymer constituting the core of the optical fiber was taken out to be subject to measurement. In the polymer, a residual monomer and a dimer contents were 0.24 wt % and 0.05 wt %, respectively.

In this polymer, a content of sulfur components (as sulfur atoms) which are bound to the polymer (a bound-sulfur content) was 600 ppm, while a content of sulfur components (as sulfur atoms) which are not bound to the polymer (a residual-sulfur content) was 0.7 ppm.

This polymer exhibited a weight average molecular weight (Mw) of 90,000 by GPC method and a ratio of weight average molecular weight/number average molecular weight (Mw/Mn) was 2.0. A glass transition point determined with a differential scanning calorimeter was as high as 120° C., indicating that the polymer had good thermal properties.

This optical fiber exhibited low transmission losses of 70, 62 and 125 dB/km at wavelengths of 520, 570 and 650 nm, respectively, i.e., it had significantly excellent optical properties.

The optical fiber after coated with polyethylene to an outer diameter of 2.2 mm was subject to a repetitive bending test, It exhibited good mechanical strength with a bending number of 20,000.

EXAMPLE 11

A polymer was prepared in a similar method as described in Example 10, except that a concentration of n-butyl mercaptan was $2.0 \times 10^{-3}$ mol/1 mol monomer. Subsequently, an optical fiber with a fiber diameter of 1000 µm was prepared in a similar manner as described in Example 10, except that a nozzle temperature was set to 210° C.

In a similar manner as described in Example 10, only the polymer constituting the core of the optical fiber was taken out to be subject to measurement. In the polymer, a residual monomer and a dimer contents were 0.20 wt % and 0.06 wt %, respectively.

In this polymer, a content of sulfur components which are bound to the polymer was 670 ppm, while a content of sulfur components which are not bound to the polymer was 1.0 ppm.

This polymer exhibited a weight average molecular weight (Mw) of 80,000 by GPC method and a ratio of weight average molecular weight/number average molecular weight (Mw/Mn) was 2.0. A glass transition point determined with a differential scanning calorimeter was as high as 120° C., indicating that the polymer had good thermal properties.

This optical fiber exhibited low transmission losses of 68, 60 and 121 dB/km at wavelengths of 520, 570 and 650 nm, respectively, i.e., it had significantly excellent optical properties. In a repetitive bending test carried out in a similar manner as described in Example 10, it exhibited good mechanical strength with a bending number of 15,000.

EXAMPLE 12

A polymer was prepared in a similar method as described in Example 10, except that the amount of dimethyl 2,2'- azobis(2-methylpropionate) was $2.0 \times 10^{-5}$ mol/1 mol monomer, the amount of n-butyl mercaptan was $2.0 \times 10^{-3}$ mol/1 mol monomer, a polymerization temperature was 126° C. and an average residence time was 3.0 hrs. Subsequently, an optical fiber having a fiber diameter of 1000 μm was obtained in a similar manner as described in Example 10, except that a nozzle temperature was set to 210° C.

In a similar manner as described in Example 10, only the polymer constituting the core of the optical fiber was taken out to be subject to measurement. In the polymer, a residual monomer and a dimer contents were 0.16 wt % and 0.018 wt %, respectively.

In this polymer, a content of sulfur components which are bound to the polymer was 640 ppm, while a content of sulfur components which are not bound to the polymer was 0.9 ppm.

This polymer exhibited a weight average molecular weight (Mw) of 82,000 by GPC method and a ratio of weight average molecular weight/number average molecular weight (Mw/Mn) was 2.0. A glass transition point determined with a differential scanning calorimeter was as high as 120° C., indicating that the polymer had good thermal properties.

This optical fiber exhibited low transmission losses of 71, 62 and 124 dB/km at wavelengths of 520, 570 and 650 nm, respectively, i.e., it had significantly excellent optical properties. In a repetitive bending test, it exhibited good mechanical strength with a bending number of 15,000 equivalent to that in Example 11.

The polymer in this example had properties almost equivalent to those for the polymer in Example 11, except for a lower dimer content. In this example, despite lower monomer and dimer contents in the polymer, a transmission loss was substantially equivalent to that in Example 11.

EXAMPLE 13

A polymer was prepared in a similar method as described in Example 10, except that an initiator was 2,2'-azobis(2,4,4-trimethylpentane) in a ratio of $1.3 \times 10^{-5}$ mol/1 mol monomer. A polymer content immediately after taking out the reaction mixture from the reactor, which was calculated from the amount of the reaction mixture fed and the amount of the polymer produced after removing the volatiles, was 45 wt % equivalent to the value in Example 10. Subsequently, an optical fiber having a fiber diameter of 1000 μm was prepared in a similar manner as described in Example 10.

In a similar manner as described in Example 10, only the polymer constituting the core of the optical fiber was taken out to be subject to measurement. In the polymer, a residual monomer and a dimer contents were 0.23 wt % and 0.05 wt %, respectively.

In this polymer, a content of sulfur components which are bound to the polymer was 610 ppm, while a content of sulfur components which are not bound to the polymer was 0.7 ppm.

This polymer exhibited a weight average molecular weight (Mw) of 90,000 by GPC method and a ratio of weight average molecular weight/number average molecular weight (Mw/Mn) was 2.0. A glass transition point determined with a differential scanning calorimeter was as high as 120° C., indicating that the polymer had good thermal properties.

This optical fiber exhibited transmission losses of 82, 72 and 130 dB/km at wavelengths of 520, 570 and 650 nm, respectively. In a repetitive bending test, it exhibited good mechanical strength with a bending number of 20,000 equivalent to that in Example 10.

The process of this example was almost as similar as described in Example 10, except that a different initiator was used. In this example, a transmission loss was slightly higher, despite that the residual monomer content, the dimer content, the molecular weight and the heat history were almost as similar as described in Example 10. The optical fiber, however, had better transmission performance than that prepared by a conventional manufacturing process, because of a lower content of sulfurs which are not bound to the polymer in the polymer.

EXAMPLE 14

A polymer was prepared in a similar method as described in Example 10, except that a concentration of n-butyl mercaptan was $1.4 \times 10^{-3}$ mol/1 mol monomer. Subsequently, an optical fiber having a fiber diameter of 1000 μm was obtained in a similar manner as described in Example 10, except that a nozzle temperature was set to 235° C.

In a similar manner as described in Example 10, only the polymer constituting the core of the optical fiber was taken out to be subject to measurement. In the polymer, a residual monomer and a dimer contents were 0.24 wt % and 0.06 wt %, respectively.

In this polymer, a content of sulfur components which are bound to the polymer was 490 ppm, while a content of sulfur components which are not bound to the polymer was 1.2 ppm.

This polymer exhibited a weight average molecular weight (Mw) of 110,000 by GPC method and a ratio of weight average molecular weight/number average molecular weight (Mw/Mn) was 2.0. A glass transition point determined with a differential scanning calorimeter was 120° C.

This optical fiber exhibited transmission losses of 81, 70 and 132 dB/km at wavelengths of 520, 570 and 650 nm, respectively. The fiber exhibited a higher transmission loss than that in Example 10, but its transmission performance was better than an optical fiber prepared by a conventional manufacturing process. In a repetitive bending test, it exhibited good mechanical strength with a bending number of 22,000.

EXAMPLE 15

A polymer was prepared in a similar method as described in Example 10, except that a concentration of n-butyl mercaptan was $2.5 \times 10^{-3}$ mol/1 mol monomer. Subsequently, an optical fiber having a fiber diameter of 1000 μm was obtained in a similar manner as described in Example 10, except that a nozzle temperature was set to 205° C.

In a similar manner as described in Example 10, only the polymer constituting the core of the optical fiber was taken out to be subject to measurement. In the polymer, a residual monomer and a dimer contents were 0.17 wt % and 0.02 wt %, respectively.

In this polymer, a content of sulfur components which are bound to the polymer was 720 ppm, while a content of sulfur components which are not bound to the polymer was 1.0 ppm.

This polymer exhibited a weight average molecular weight (Mw) of 64,000 by GPC method and a ratio of weight average molecular weight/number average molecular weight (Mw/Mn) was 2.0. A glass transition point determined with a differential scanning calorimeter was as high as 117° C., indicating that the polymer had good thermal properties.

Although exhibiting relatively lower mechanical strength with a bending number of 8,000 in a repetitive bending test, the optical fiber exhibited low transmission losses of 68, 60 and 120 dB/km at wavelengths of 520, 570 and 650 nm, respectively, i.e., it had significantly excellent optical properties.

COMPARATIVE EXAMPLE 6

A polymer was prepared in a similar method as described in Example 10, except that in a ratio of $1.8 \times 10^{-3}$ mol/1 mol monomer of n-octyl mercaptan was used instead of n-butyl mercaptan. Subsequently, an optical fiber having a fiber diameter of 1000 μm was obtained in a similar manner as described in Example 10.

In a similar manner as described in Example 10, only the polymer constituting the core of the optical fiber was taken out to be subject to measurement. In the polymer, a residual monomer and a dimer contents were 0.24 wt % and 0.06 wt %, respectively.

In this polymer, a content of sulfur components which are bound to the polymer was 590 ppm, while a content of sulfur components which are not bound to the polymer was 27 ppm.

This polymer exhibited a weight average molecular weight (Mw) of 90,000 by GPC method and a ratio of weight average molecular weight/number average molecular weight (Mw/Mn) was 2.0. A glass transition point determined with a differential scanning calorimeter was as high as 120° C., indicating that the polymer was good in the sense of thermal properties.

This optical fiber exhibited transmission losses of 92, 85 and 136 dB/km at wavelengths of 520, 570 and 650 nm, respectively. Thus, it had a higher transmission loss despite that the residual monomer content, the dimer content, the molecular weight and the heat history were almost similar as described in Example 10.

COMPARATIVE EXAMPLE 7

A polymer was prepared in a similar method as described in Example 10, except that for operation conditions in a devolatilization step, a reaction mixture at the polymerization temperature of 130° C. was directly fed to an extruder without further heating, and a pressure of the inlet (rear vent) was 600 Torr while pressures of the second and the third vents were 50 Torr for devolatilization. Subsequently, an optical fiber having a fiber diameter of 1000 μm was obtained in a similar manner as described in Example 10.

In a similar manner as described in Example 10, only the polymer constituting the core of the optical fiber was taken out to be subject to measurement. In the polymer, a residual monomer and a dimer contents were 0.41 wt % and 0.09 wt %, respectively.

In this polymer, a content of sulfur components which are bound to the polymer was 600 ppm, while a content of sulfur components which are not bound to the polymer was 8 ppm.

This polymer exhibited a weight average molecular weight (Mw) of 90,000 by GPC method and a ratio of weight average molecular weight/number average molecular weight (Mw/Mn) was 2.0. A glass transition point determined with a differential scanning calorimeter was as high as 117° C., indicating that the polymer was good in the sense of thermal properties.

The optical fiber exhibited higher transmission losses of 90, 83 and 135 dB/km at wavelengths of 520, 570 and 650 nm, respectively.

The above results are summarized in Table 3.

TABLE 3

| Exam. No. | Radical initiator | Molecular weight (Mw) | Bound sulfur content (ppm) | Residual sulfur content (ppm) | Residual monomer content (ppm) | Residual dimer content (ppm) | Transmission loss (dB/km) | | | Bending number |
|---|---|---|---|---|---|---|---|---|---|---|
| | | | | | | | 520 nm | 570 nm | 650 nm | |
| Ex. 10 | (A) | 90,000 | 600 | 0.7 | 2400 | 500 | 70 | 62 | 125 | 20,000 |
| Ex. 11 | (A) | 80,000 | 670 | 1.0 | 2000 | 600 | 68 | 60 | 121 | 15,000 |
| Ex. 12 | (A) | 82,000 | 640 | 0.9 | 1600 | 180 | 71 | 62 | 124 | 15,000 |
| Ex. 13 | (B) | 90,000 | 610 | 0.7 | 2300 | 500 | 82 | 72 | 130 | 20,000 |
| Ex. 14 | (A) | 110,000 | 490 | 1.2 | 2400 | 600 | 81 | 70 | 132 | 22,000 |
| Ex. 15 | (A) | 64,000 | 720 | 1.0 | 1700 | 200 | 68 | 60 | 120 | 8,000 |
| Comp. Ex. 6 | (A) | 90,000 | 590 | 27 | 2400 | 600 | 92 | 85 | 136 | 20,000 |
| Comp. Ex. 7 | (A) | 90,000 | 600 | 8 | 4100 | 900 | 90 | 83 | 135 | 18,000 |

Initiator (A): dimethyl 2,2'-azobis(2-methylpropionate)
Initiator (B): 2.2'-azobis(2,4,4-trimethylpentane)

EXAMPLE 16

Preparation solution 1 which was prepared by adding, to an MMA, dimethyl 2,2'-azobis(2-methylpropionate) (Wako Pure Chemicals V-601, purity: 99 wt %) in a ratio of $1.8 \times 10^{-5}$ mol/1 mol monomer and n-butyl mercaptan (ELF ATOCHEM NORTH AMERICA INC, purity: 99.5 wt %) in a ratio of $1.8 \times 10^{-3}$ mol/1 mol monomer, respectively, was continuously fed into a reactor 1. Separately, preparation solution 2 which was prepared by adding, to a mixture of MMA and 2,2,3,3-tetrafluoropropyl methacrylate (4FM) (80/20 wt %), dimethyl 2,2'-azobis(2-methylpropionate) (Wako Pure Chemicals V-601, purity: 99 wt %) in a ratio of $1.8 \times 10^{-5}$ mol/1 mol monomer and n-butyl mercaptan (ELF ATOCHEM NORTH AMERICA INC, purity: 99.5 wt %) in a ratio of $1.8 \times 10^{-3}$ mol/1 mol monomer, was continuously fed into a reactor 2. In both reactors 1 and 2, a polymerization temperature was controlled to 130° C. and the mixture was stirred and mixed with a stirring blade. In polymerization, an average residence time of each reaction mixture in a polymerization zone was set to 3.6 hours. While these reaction mixtures were continuously taken out from the reactors 1 and 2, the mixtures heated to 190° C. were continuously sent to rear-vented type of 3-vent single-screw devolatilization extruders 1 and 2 each having a screw diameter of 40 mm using a pump at a rate of 15 L/hr for separating and removing volatiles to obtain polymers. A pressure in an inlet (rear vent: the first vent) was 100 Torr, while pressures in the second and the third vents were 50

Torr. An extruder temperature in the inlet was set to 220° C. while those in the second and the third vents to 240° C. A screw revolution speed was 60 rpm.

Polymer contents immediately after taking out the mixtures from the reactors 1 and 2 were 45 wt % and 47 wt %, respectively, which were calculated from the amount of the reaction mixture fed and the amount of the polymer collected after removing the volatiles.

A residual monomer content in the polymer 1 obtained from the devolatilization extruder 1 was 0.24 wt % for MMA, while residual monomer contents in the polymer 2 obtained from the devolatilization extruder 2 were 0.14 wt % for MMA and 0.11 wt % for 4FM. Contents of sulfur components which are chemically bound to the polymers 1 and 2 were 600 and 560 ppm, respectively, while contents of sulfur components which are not chemically bound to the polymers were 0.7 and 1 ppm, respectively.

Then, the polymers 1 and 2 extruded without being exposed to the air from the tips of the devolatilization extruders 1 and 2 were continuously and directly fed to a three-layer multi-component spinning nozzle. While the above polymers 1 and 2 were fed as cores 1 (the inner layer of the core) and 2 (the outer layer of the core) and a separately prepared polymer of 28 wt parts of 1,1,2,2-tetrahydroperfluorodecyl methacrylate (17FM), 71 wt parts of MMA and 1 wt part of methacrylic acid (MAA) was fed as a sheath material, a melt multi-component spinning was conducted to obtain a multi-layered optical fiber having a fiber diameter of 750 µm, whose transmission performance was evaluated. The core 1 had a diameter of 450 µm while the core 2 had a thickness of 135 µm and a sheath thickness of 15 µm. In this process, the multi-component spinning nozzle conditions were controlled as a constant nozzle pressure of 30 kg/cm$^2$ and a nozzle temperature of 220° C.

This optical fiber exhibited extremely low transmission losses of 70, 62 and 119 dB/km at wavelengths of 520, 570 and 650 nm, respectively, i.e., it had significantly excellent optical properties.

A transmission band for a fiber length of 50 m was 550 MHz.

In a durability test at temperatures of 85° C. and 70° C. and at a relative humidity of 95% for 10,000 hrs, a transmission loss increased by 30 dB/km or less and a transmission band was not significantly changed.

EXAMPLE 17

Four different core materials were prepared in a similar method as described in Example 16, except that preparation conditions were set as shown in Table A, and these core materials and sheath and protective-layer materials shown in Table A were fed to a 6-layer multi-component spinning nozzle to obtain an optical fiber shown in Table A. The evaluation results are shown in Table B.

EXAMPLE 18

Three different core materials were prepared in a similar method as described in Example 16, except that the preparation conditions were set as shown in Table A, and these core materials and a sea material and a protective-layer material shown in Table A were fed to a multi-component spinning nozzle for a multiple core fiber to obtain a sea-island type optical fiber as shown in Table A where 37 islands consisting of three kinds of concentrically piled core materials were assembled through a sea part and a protective layer was formed on the periphery. On the periphery of the optical fiber was applied a coating layer made of a blend of vinyl chloride and an ethylene/vinyl acetate copolymer (Toyo Ink Co. Ltd.: 314) to obtain a multi-core optical fiber cable having an outer diameter ϕ of 2.2 mm. There were observed no damages in the core part of the periphery. The evaluation results are shown in Table B. The optical fiber was cut to give a 5 m piece, whose ends were ground. Introducing light from its one end, brightness for each island was observed at the other end, and brightness was substantially even throughout the fiber.

EXAMPLES 19 and 20

Each of optical fibers shown in Table A was prepared in a similar method as described in Example 16, except that the preparation conditions were set as shown in Table A. The evaluation results are shown in Table B.

COMPARATIVE EXAMPLE 8

An optical fiber shown in Table A was prepared in a similar method as described in Example 16, except that the preparation conditions were set as shown in Table A.

In both reactors 1 and 2, a polymer content in a reaction mixture, however, considerably varied in a range of 42 wt % to 50 wt %, and a polymerization temperature was also unstable, i.e., stable operation was difficult. When observing the insides of the reactors 1 and 2 after operation, there was found a large amount of gelled polymer attachment on the reactor inside. For an optical fiber prepared in a similar manner as described in Example 16 with the polymer thus obtained, a diameter of the fiber was not uniform with many locally: thicker parts. Therefore, the level of the optical fiber was insufficient for industrial use.

COMPARATIVE EXAMPLE 9

An optical fiber shown in Table A was prepared in a similar method as described in Example 16, except that the preparation conditions were set as shown in Table A.

Although in both reactors 1 and 2 a polymerization temperature was intended to be adjusted to 130° C. by controlling a jacket temperature in the reactors, it was not stable in a range of 130 to 140° C., and a polymer content in a reaction mixture considerably varied in a range of 40 wt % to 55 wt % immediately after taking out it from the reactor, i.e., stable operation was difficult. When observing the insides of the reactors 1 and 2 after operation, there was found a large amount of gelled polymer attachment on the reactor inside.

For an optical fiber prepared in a similar manner as described in Example 16 with the polymer thus obtained, polymer lumps with a higher molecular weight (gel) were unevenly distributed, and a diameter of the fiber was not uniform, i.e., there were alternately thicker and thinner parts. Therefore, the level of the optical fiber was insufficient for industrial use.

EXAMPLE 21

Polymerization was conducted in a similar method as described in Example 10. A reaction mixture was continuously taken out from a reactor, transferred while being heated to 190° C., and fed to a single-screw devolatilization extruder as described in Example 10 for separating and removing volatiles to obtain a polymer. The operation conditions for the single-screw devolatilization extruder were similar as described in Example 10.

Subsequently, using the polymer extruded from the tip of the extruder in a similar manner as described in Example 10, a core-sheath type optical fiber having a fiber diameter of 1000 μm was obtained, which was evaluated for its transmission performance and residual volatiles in the core.

In the core, a residual monomer and a dimer contents were 0.78 and 0.12 wt %, respectively. A content of sulfur components which are bound to the polymer in the core was 600 ppm, while a content of sulfur components which are not bound to the polymer was 8.9 ppm.

A weight average molecular weight (Mw) by GPC method was 90,000 and a ratio of Mw/Mn was 2.0, which was equivalent to the value in Example 10.

The optical fiber exhibited large transmission losses of 93, 87 and 136 dB/km at 520, 570 and 650 nm, respectively.

EXAMPLE 22

In the process described in Example 1, the volatiles separated and removed in the devolatilization step were cooled in a condenser to collect a liquid (1000 kg) in a tank. For the collected liquid, n-butyl mercaptan was quantitatively analyzed by hydrogen flame gas chromatography. The result was 1,500 ppm. The collected liquid appeared to be very slight pale yellow. To 1000 kg of the collected liquid were added 250 g of cupric oxide (copper (II) oxide) as a catalyst and 10 g of cupric chloride (copper (II) chloride) as a chloride. The mixture kept at 60° C. was stirred with a double propeller-blade stirrer at 200 rpm while feeding air from the bottom of the tank in a rate of 10 L/min. After 4 hours, the liquid was cooled to 20° C. and quantitatively analyzed for an amount of residual n-butyl mercaptan. The result was below a determination limit (1 ppm).

After filtration, to the liquid was added hydroquinone as a polymerization inhibitor to 50 ppm, and the mixture was distilled at 40° C. under 100 Torr for purification. For a distillate after about 98% distillation, n-butyl mercaptan and di-n-butyl disulfide were quantitatively analyzed. The results were below a determination limit (1 ppm).

Feeding the distillate as a starting material into the reactor in Example 1, a polymer was prepared under the conditions similar as described in Example 1 and a core-sheath type plastic optical fiber was prepared in a similar manner as described in Example 1.

The optical fiber exhibited transmission losses of 71, 62 and 132 dB/km at 520, 570 and 650 nm, respectively, which were equivalent to those in Example 1, indicating that the fiber had a lower transmission loss and good optical properties.

EXAMPLE 23

To a reaction raw material consisting of a monomer mixture of the distillate in Example 22 and methyl acrylate (MA) (98:2 by weight) were added dimethyl 2,2'-azobis(2-methylpropionate) (Wako Pure Chemicals V-601, purity: 99 wt %) in a ratio of $1.5 \times 10^{-5}$ mol/1 mol monomer and n-octyl mercaptan (ELF ATOCHEM NORTH AMERICA INC, purity: 99.5 wt %) in a ratio of $1.75 \times 10^{-3}$ mol/1 mol monomer, and the mixture was continuously fed into a reactor for polymerization under the conditions of a polymerization temperature of 135° C. and an average residence time of 4 hours to conduct polymerization in a similar manner as described in Example 1. Then, the mixture was fed to a vented extruder for separating and removing volatiles to obtain a polymer pellet. With respect to the reaction mixture immediately after taking out it from the reactor, a polymer and a dimer contents were 44 wt % and 0.05 wt %, respectively. With respect to the polymer obtained after removing the volatiles from the reaction mixture, a residual monomer and a dimer contents were 0.1 wt % and 0.03 wt %, respectively.

This polymer exhibited a weight average molecular weight (Mw) of 95,000 by gel permeation chromatography (GPC method) and a ratio of weight average molecular weight/number average molecular weight (Mw/Mn) was 2.0. Thus, the polymer had a considerably narrow molecular weight distribution.

A heating loss temperature determined with a thermobalance was 295° C. and a glass transition point determined with a differential scanning calorimeter was as high as 117° C., indicating that the polymer had good thermal properties. With respect to the polymer, n-butyl mercaptan was quantitatively analyzed, but not detected.

The polymer was fed as a starting material to a material inlet in an injection molding machine for molding under the conditions of a cylinder temperature of 250° C. and a molding cycle of 30 sec, to provide 100 plates having dimensions of 110 mm×110 mm×5 mm. During the molding process, bad smell was not observed and there were no problems in terms of a work environment. The plates were macroscopically observed for their coloring and coloring was not observed in comparison with a commercially available methacrylic resin molding material (Mitsubishi Rayon Co. Ltd.: Acrypet VH).

As described above, a methyl methacrylate polymer having adequately good optical properties and a plastic optical fiber having improved transmission performance can be prepared according to this invention.

This invention can also provide an optical fiber, an optical fiber cable and an optical fiber cable with a plug having extremely lower transmission loss, which cannot be achieved according to the prior art. Furthermore, this invention can provide a process for readily manufacturing such an optical fiber.

TABLE A

|        |                                      | Example 16 | Example 17 | Example 18 | Example 19        |
|--------|--------------------------------------|------------|------------|------------|-------------------|
| Core 1 | Core number                          | 1          | 1          | 37         | 1                 |
|        | Composition                          | MMA        | MMA        | MMA        | MMA               |
|        | Initiator                            | V601       | V601       | V601       | di-tert-butyl peroxide |
|        | Initiator conc. ($*10^{-5}$ mol/1 mol monomer) | 1.8        | 1.8        | 1.8        | 1.8               |
|        | Polymerization temp.                 | 130        | 130        | 130        | 155               |

TABLE A-continued

|  |  |  |  |  |  |
|---|---|---|---|---|---|
|  | (° C.) |  |  |  |  |
|  | Mercaptan, conc. (*10⁻³ mol/1 mol monomer) | n-BtSH 1.8 | n-BtSH 1.8 | n-BtSH 1.8 | n-BtSH 1.8 |
|  | Average residence time (hrs) | 3.6 | 3.6 | 3.6 | 3.6 |
|  | Polymer content (wt %) | 45 | 45 | 45 | 45 |
|  | Residual monomer (MMA, wt %) | 0.24 | 0.18 | 0.18 | 0.11 |
|  | Residual monomer (4FM, wt %) |  |  |  |  |
|  | Bound sulfur component (ppm) | 600 | 600 | 600 | 620 |
|  | Non-bound sulfur component (ppm) | 0.7 | 0.8 | 0.8 | 2 |
|  | Diameter (μm) | 450 | 400 | 50% (Note 1) | 450 |
| Core 2 | Composition | MMA/4FM = 80/20 wt % | MMA/4FM = 90/10 wt % | MMA/4FM = 90/10 wt % | MMA/4FM = 80/20 wt % |
|  | Initiator | V601 | V601 | V601 | di-tert-butyl peroxide |
|  | Initiator conc. (*10⁻⁵ mol/1 mol monomer) | 1.8 | 1.8 | 1.8 | 1.8 |
|  | Polymerization temp. (° C.) | 130 | 130 | 130 | 155 |
|  | Mercaptan, conc. (*10⁻³ mol/1 mol monomer) | n-BtSH 1.8 | n-BtSH 1.8 | n-BtSH 1.8 | n-BtSH 1.8 |
|  | Average residence time (hrs) | 3.6 | 3.6 | 3.6 | 3.6 |
|  | Polymer content (wt %) | 47 | 47 | 47 | 47 |
|  | Residual monomer (MMA, wt %) | 0.14 | 0.19 | 0.19 | 0.15 |
|  | Residual monomer (4FM, wt %) | 0.11 | 0.02 | 0.02 | 0.13 |
|  | Bound sulfur component (ppm) | 560 | 580 | 580 | 605 |
|  | Non-bound sulfur component (ppm) | 1 | 0.9 | 0.9 | 2 |
|  | Thickness (μm) | 135 | 75 | 20% (Note 1) | 135 |
| Core 3 | Composition | — | MMA/4FM = 80/20 wt % | MMA/4FM = 80/20 wt % | — |
|  | Initiator | — | V601 | V601 | — |
|  | Initiator conc. (*10⁻⁵ mol/1 mol monomer) | — | n-BtSH 1.8 | n-BtSH 1.8 | — |
|  | Polymerization temp. (° C.) | — | 130 | 130 | — |
|  | Mercaptan, conc. (*10⁻³ mol/1 mol monomer) | — | 1.8 | 1.8 | — |
|  | Average residence time (hrs) | — | 3.6 | 3.6 | — |
|  | Polymer content (wt %) | — | 47 | 47 | — |
|  | Residual monomer (MMA, wt %) | — | 0.14 | 0.14 | — |
|  | Residual monomer (4FM, wt %) | — | 0.07 | 0.07 | — |
|  | Bound sulfur component (ppm) | — | 560 | 560 | — |
|  | Non-bound sulfur component (ppm) | — | 1 | 1 | — |
|  | Thickness (μm) | — | 50 | 10% (Note 1) | — |
| Core 4 | Composition | — | MMA/4FM = 70/30 wt % | — | — |
|  | Initiator | — | V601 | — | — |
|  | Initiator conc. (*10⁻³ mol/1 mol monomer) | — | n-BtSH 1.8 | — | — |
|  | Polymerization temp. (° C.) | — | 130 | — | — |
|  | Mercaptan, conc. (*10⁻³ mol/1 mol monomer) | — | 1.8 | — | — |
|  | Average residence time (hrs) | — | 3.6 | — | — |
|  | Polymer content (wt %) | — | 48 | — | — |
|  | Residual monomer (MMA, wt %) | — | 0.09 | — | — |
|  | Residual monomer (4FM, wt %) | — | 0.1 | — | — |
|  | Bound sulfur component (ppm) | — | 550 | — | — |
|  | Non-bound sulfur component (ppm) | — | 1 | — | — |
|  | Thickness (μm) | — | 30 | — | — |

TABLE A-continued

| Sheath | Copolymer composition | 17FM/MMA/MAA = 28/71/1 wt % | 17FM/MMA/MAA = 30/69/1 wt % | (VdF/TFE) = 80/20 wt % MI = 40 (sea material) | 17FM/MMA/MAA = 28/71/1 wt % |
|---|---|---|---|---|---|
| | Thickness (μm) | 15 | 10 | 15 % (Note 1)(Sea) | 15 |
| Protect. layer | Copolymer composition | — | p-(VdF/TFE) = 80/20 wt % | (VdF/TFE) = 80/20 wt %, MI = 120 (protect. of the outermost periphery) | |
| | Thickness (μm) | — | 10 | 5% (Note 1) | |
| | Nozzle temperature (° C.) | 220 | 210 | 220 | 220 |

| | | | Example 20 | Comparative Example 8 | Comparative Example 9 |
|---|---|---|---|---|---|
| | | Core number | 1 | 1 | 1 |
| Core 1 | | Composition | MMA | MMA | MMA |
| | | Initiator | V601 | V601 | V601 |
| | | Initiator conc. (*10$^{-5}$ mol/1 mol monomer) | 1.8 | 1.8 | 8.7 |
| | | Polymerization temp. (° C.) | 130 | 110 | 130 to 140 (unstable) |
| | | Mercaptan, conc. (*10$^{-3}$ mol/1 mol monomer) | OcSH 1.2 | n-BtSH 1.8 | n-BtSH 1.8 |
| | | Average residence time (hrs) | 3.6 | 3.6 | 1 |
| | | Polymer content (wt %) | 45 | 42 to 50 (unstable) | 40 to 50 (unstable) |
| | | Residual monomer (MMA, wt %) | 0.24 | | |
| | | Residual monomer (4FM, wt %) | | | |
| | | Bound sulfur component (ppm) | 585 | | |
| | | Non-bound sulfur component (ppm) | 87 | | |
| | | Diameter (μm) | | | |
| Core 2 | | Composition | MMA/4FM = 80/20 wt % | MMA/4FM = 80/20 wt % | MMA/4FM = 80/20 wt % |
| | | Initiator | V601 | V601 | V601 |
| | | Initiator conc. (*10$^{-5}$ mol/1 mol monomer) | 1.8 | 1.8 | 8.7 |
| | | Polymerization temp, (° C.) | 130 | 110 | 130 to 140 (unstable) |
| | | Mercaptan, conc. (*10$^{-3}$ mol/1 mol monomer) | OcSHn-BtSH 1.2 | n-BtSHn-BtSH 1.8 | n-BtSH 1.8 |
| | | Average residence time (hrs) | 3.6 | 3.6 | 1 |
| | | Polymer content (wt %) | 47 | 42 to 50 (unstable) | 40 to 55 (unstable) |
| | | Residual monomer (MMA, wt %) | 0.14 | | |
| | | Residual monomer (4FM, wt %) | 0.11 | | |
| | | Bound sulfur component (ppm) | 580 | | |
| | | Non-bound sulfur component (ppm) | 102 | | |
| | | Thickness (μm) | | | |
| Core 3 | | Composition | — | — | — |
| | | Initiator | — | — | — |
| | | Initiator conc. (*10$^{-5}$ mol/1 mol monomer) | — | — | — |
| | | Polymerization temp. (° C.) | | | |
| | | Mercaptan, conc. (*10$^{-3}$ mol/1 mol monomer) | — | — | — |
| | | Average residence time (hrs) | — | — | — |
| | | Polymer content (wt %) | — | — | — |
| | | Residual monomer (MMA, wt %) | — | — | — |
| | | Residual monomer (4FM, wt %) | — | — | — |
| | | Bound sulfur component | — | — | — |

TABLE A-continued

|  |  | (ppm) |  |  |  |
|---|---|---|---|---|---|
|  |  | Non-bound sulfur component (ppm) | — | — | — |
|  |  | Thickness (μm) |  |  |  |
|  | Core 4 | Composition | — | — | — |
|  |  | Initiator | — | — | — |
|  |  | Initiator conc. (*10$^{-5}$ mol/1 mol monomer) | — | — | — |
|  |  | Polymerization temp. (° C.) | — | — | — |
|  |  | Mercaptan, conc. (*10$^{-3}$ mol/1 mol monomer) | — | — | — |
|  |  | Average residence time (hrs) | — | — | — |
|  |  | Polymer content (wt %) | — | — | — |
|  |  | Residual monomer (MMA, wt %) | — | — | — |
|  |  | Residual monomer (4FM, wt %) | — | — | — |
|  |  | Bound sulfur component (ppm) | — | — | — |
|  |  | Non-bound sulfur component (ppm) | — | — | — |
|  |  | Thickness (μm) | — | — | — |
|  | Sheath | Copolymer composition | 17FM/MMA/MAA = 28/71/1 wt % |  |  |
|  |  | Thickness (μm) |  |  |  |
|  | Protect. layer | Copolymer composition |  |  |  |
|  |  | Thickness (μm) |  |  |  |
|  |  | Nozzle temperature (° C.) | 220 | 220 | 220 |

(Note 1) An area occupancy rate for each part in the cross-section area of an optical fiber In this table, n-BtSH: n-butyl mercaptan, OcSH: n-octyl mercaptan.

TABLE B

| Example No. | Radical initiator | Transmission loss (dB/km) 520 nm | 570 nm | 650 nm | Transmission band (MHz) −50 m | Increase in heat/ moisture resistance (dB/km) |
|---|---|---|---|---|---|---|
| 16 | (A) | 70 | 62 | 119 | 550 | 30 |
| 17 | (A) | 68 | 60 | 121 | 820 | 30 |
| 18 | (A) | — | — | 139 | 800 | 32 |
| 19 | (B) | 85 | 74 | 133 | — | 60 |
| 20 | (A) | 92 | 85 | 136 | 200 | 200 |

Initiator (A): dimethyl 2,2'-azobis(2-methylpropionate)
Initiator (B): di-t-butyl peroxide

What is claimed is:

1. A process for manufacturing a methacrylate (co)polymer comprising conducting polymerization while feeding a monomer (mixture) containing at least 90 wt % in total of at least one methacrylate monomer and a radical polymerization initiator represented by formula (II) into a reactor and for an average residence time of 2 to 6 hours, where an initiator concentration and a polymerization temperature satisfy a relationship represented by equations (1) to (4) and the polymerization temperature is not less than 110° C. and not more than 160° C.;

$$\ln(A) \leq 105.4 - 45126/B \quad (1)$$

$$\ln(A) \leq 2545.2/B - 15.82 \quad (2)$$

$$\ln(A) \geq 225.9 - 102168.8/B \quad (3)$$

$$\ln(A) \geq 1300.0/B - 15.74 \quad (4)$$

wherein A is an initiator concentration (a molar ratio of the initiator/the monomer); B is a polymerization temperature (° K); and ln is a symbol for a natural logarithm;

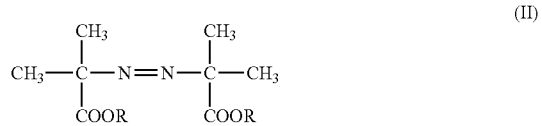

wherein R is alkyl or fluoroalkyl.

2. The process as claimed in claim 1, where an inert solvent is further fed to the reactor in the polymerization step and instead that the initiator concentration and the polymerization temperature satisfy the relationship represented by the above equations (1) to (4), the initiator concentration, the polymerization temperature and an inert solvent concentration satisfy a relationship represented by equations (5) to (8):

$$\ln\{A \times (1-C)^5\} \leq 105.4 - 45126/B \quad (5)$$

$$\ln\{A \times (1-C)^5\} \leq 2545.2/B - 15.82 \quad (6)$$

$$\ln\{A \times (1-C)^5\} \geq 225.9 - 102168.8/B \quad (7)$$

$$\ln\{A \times (1-C)^5\} \geq 1300.0/B - 15.74 \quad (8)$$

wherein A is an initiator concentration (a molar ratio of the initiator/the monomer); B is a polymerization temperature (° K); C is the concentration of the inert solvent (the amount of the inert solvent (g)/the total amount of the monomer, the initiator, the chain transfer agent and the inert solvent fed into the reactor (g)); and ln is a symbol for a natural logarithm.

3. The process as claimed in claim 1, where the monomer (mixture) contains at least one monomer selected from the group consisting of methyl methacrylate, a fluoroalkyl methacrylate and benzyl methacrylate.

4. The process as claimed in claim 1, where in the polymerization step, methyl methacrylate is used as one methacrylate monomer, the content of methyl methacrylate in the monomer (mixture) is at least 80 wt %, and the compound represented by formula (III) is used as a radical polymerization initiator:

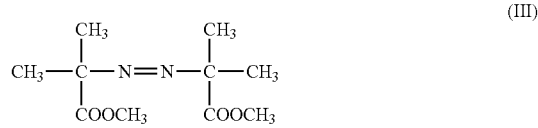

(III)

5. The process as claimed in claim 1, further comprising a feeding step of feeding a reaction mixture taken out from the reactor to a devolatilization step and a devolatilization step of separating and removing volatiles from the reaction mixture.

6. The process as claimed in claim 4, further comprising a feeding step of feeding a reaction mixture taken out from the reactor to a devolatilization step and a devolatilization step of separating and removing volatiles from the reaction mixture.

7. The process as claimed in claim 5, where in the polymerization step, the monomer (mixture) and the initiator are continuously fed to the reactor for bulk polymerization and in the feeding step, the reaction mixture is continuously fed from the reactor to the devolatilization step.

8. The process as claimed in claim 5, where a polymer content in the reaction mixture in the polymerization zone is 30 wt % to 70 wt % both inclusive.

9. The process as claimed in claim 5, where in the polymerization step an alkyl mercaptan having 3 to 6 carbon atoms is further fed to the reactor for conducting polymerization.

10. The process as claimed in claim 5 further comprising a volatile purification step, where the volatiles separated and removed in the devolatilization step are purified using a catalyst containing at least one element selected from the group of copper, cobalt, nickel and manganese in the presence of molecular oxygen and further in the presence of a compound containing at least chlorine.

11. A process for manufacturing an optical fiber comprising feeding the (co)polymer prepared by the process as claimed in claim 5 and another polymer having a different refractive index to a multi-component spinning nozzle for spinning.

12. A process for manufacturing an optical fiber comprising feeding at least two (co)polymers mutually different in a copolymer composition and in a refractive index prepared by the process as claimed in claim 5 to a multi-component spinning nozzle for spinning by concentrically piling the polymers in a manner that a refractive index is reduced from the center toward the periphery.

13. A process for manufacturing an optical fiber comprising feeding a core material comprising a (co)polymer prepared by the process as claimed in claim 1 with other (co)polymer to a multi-component spinning nozzle for spinning by assembling a plurality of islands, where each of the islands has a core and the islands are separated from each other by other (co)polymer.

* * * * *